United States Patent
Yang et al.

(10) Patent No.: US 11,032,221 B2
(45) Date of Patent: Jun. 8, 2021

(54) METHODS AND DEVICES FOR CONTROLLING THE TIMING OF NETWORK OBJECT ALLOCATION IN A COMMUNICATIONS NETWORK

(71) Applicant: Alibaba Group Holding Limited, Grand Cayman (KY)

(72) Inventors: Boyu Yang, Hangzhou (CN); Di Zhang, Hangzhou (CN); Peng Zhang, Hangzhou (CN); Zaixiang Chen, Hangzhou (CN); Yun Chen, Hangzhou (CN); Minli Wu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 479 days.

(21) Appl. No.: 15/834,216

(22) Filed: Dec. 7, 2017

(65) Prior Publication Data
US 2018/0167346 A1    Jun. 14, 2018

(30) Foreign Application Priority Data

Dec. 12, 2016  (CN) .......................... 201611141091.6

(51) Int. Cl.
    *G06F 15/173* (2006.01)
    *H04L 12/58* (2006.01)
    (Continued)

(52) U.S. Cl.
    CPC ............... *H04L 51/08* (2013.01); *G06F 9/54* (2013.01); *H04L 51/04* (2013.01); *H04L 67/34* (2013.01)

(58) Field of Classification Search
    None
    See application file for complete search history.

(56) References Cited

U.S. PATENT DOCUMENTS

| 5,828,839 A | 10/1998 | Moncreiff |
| 6,505,275 B1 | 1/2003 | Weissman et al. |
(Continued)

FOREIGN PATENT DOCUMENTS

| CN | 1367975 A | 9/2002 |
| CN | 102063678 A | 5/2011 |
(Continued)

OTHER PUBLICATIONS

International Preliminary Report on Patentability to corresponding International Application No. PCT/US2017/065274 dated Jun. 27, 2019 (10 pages).
(Continued)

*Primary Examiner* — Phuoc H Nguyen
(74) *Attorney, Agent, or Firm* — James J. DeCarlo; Greenberg Traurig, LLP

(57) ABSTRACT

The disclosure provides methods and devices for object allocation. In one embodiment, the method comprises receiving, at a server, an object allocation message submitted by an allocation source via a communications application, the object allocation message including an identification of the allocation source, a number of to-be-allocated objects, and an object allocation time; extracting, by the server from an object set corresponding to the allocation source, objects corresponding to the number of to-be-allocated objects; controlling, by the server, acquisition times when the allocation destination will acquire the objects, so that the acquisition times do not happen before the object allocation time.

15 Claims, 47 Drawing Sheets

Determine an object allocation time included in an acquisition notification according to the acquisition notification received by a client of an allocation destination from a server, wherein the acquisition notification is used to allocate objects to be allocated from an allocation source to the allocation destination, and the object allocation time is obtained after being configured by the allocation source  — 302

When it is the object allocation time, restricting a trigger permission of the allocation destination for the acquisition notification; and when it is the object allocation time, granting the trigger permission of the allocation destination for the acquisition notification — 304

When the trigger permission is already granted, sending an object acquisition request to the server according to a detected trigger operation performed on the acquisition notification, to acquire at least part of the objects to be allocated — 306

(51) Int. Cl.
*G06F 9/54* (2006.01)
*H04L 29/08* (2006.01)

(56) References Cited

U.S. PATENT DOCUMENTS

| | | | |
|---|---|---|---|
| 6,675,378 | B1 | 1/2004 | Schmidt |
| 6,785,708 | B1 | 8/2004 | Busey et al. |
| 6,788,949 | B1 | 9/2004 | Bansal |
| 6,792,280 | B1 | 9/2004 | Hori et al. |
| 7,181,492 | B2 | 2/2007 | Wen et al. |
| 8,098,622 | B2 * | 1/2012 | Yeo .................. H04W 72/1252 370/329 |
| 8,548,865 | B1 | 10/2013 | Ho |
| 8,756,111 | B2 | 6/2014 | Carpenter |
| 8,762,267 | B2 | 6/2014 | Paintin et al. |
| 9,026,660 | B2 | 5/2015 | Murrell et al. |
| 9,128,767 | B2 * | 9/2015 | Jackson ................ G06F 9/5027 |
| 9,536,256 | B2 | 1/2017 | Toomer et al. |
| 9,721,394 | B2 | 8/2017 | Rosenthal et al. |
| 2003/0069828 | A1 | 4/2003 | Blazey et al. |
| 2005/0283420 | A1 | 10/2005 | Bailey et al. |
| 2007/0106994 | A1 * | 5/2007 | Jackson ................ G06F 9/5038 718/104 |
| 2007/0150895 | A1 | 6/2007 | Kurland |
| 2008/0216081 | A1 * | 9/2008 | Jackson .............. G06F 21/6218 718/104 |
| 2009/0217280 | A1 * | 8/2009 | Miller ....................... G06F 9/52 718/104 |
| 2009/0265204 | A1 | 10/2009 | Stinchcombe et al. |
| 2010/0096449 | A1 | 4/2010 | Denzer et al. |
| 2012/0246069 | A1 | 9/2012 | Edwards et al. |
| 2012/0316939 | A1 | 12/2012 | Moshfeghi |
| 2013/0103835 | A1 * | 4/2013 | Yotsutani .............. G06F 9/4887 709/225 |
| 2013/0136054 | A1 * | 5/2013 | Gineste .............. H04B 7/18506 370/316 |
| 2014/0272847 | A1 | 9/2014 | Grimes et al. |
| 2014/0304147 | A1 | 10/2014 | Wolff |
| 2015/0113149 | A1 * | 4/2015 | Gan ........................ H04L 47/70 709/226 |
| 2015/0189033 | A1 | 7/2015 | Han et al. |
| 2016/0234302 | A1 | 8/2016 | Yi et al. |
| 2016/0239322 | A1 * | 8/2016 | Watanabe .......... G06F 9/45558 |
| 2016/0350782 | A1 | 12/2016 | Wang |
| 2017/0076330 | A1 | 3/2017 | Proctor, Jr. et al. |
| 2018/0084429 | A1 * | 3/2018 | Guo ....................... H04W 16/14 |
| 2018/0316518 | A1 * | 11/2018 | Farrahi Moghaddam ................... H02J 3/14 |

FOREIGN PATENT DOCUMENTS

| | | | |
|---|---|---|---|
| CN | 105608603 | A | 5/2016 |
| CN | 106203989 | A | 12/2016 |

OTHER PUBLICATIONS

International Search Report and Written Opinion to corresponding International Application No. PCT/US17/65274, dated Mar. 7, 2018 (15 pages).

* cited by examiner

METHODS AND DEVICES FOR CONTROLLING THE TIMING OF NETWORK OBJECT ALLOCATION IN A COMMUNICATIONS NETWORK

CROSS-REFERENCE TO RELATED APPLICATIONS

This application claims the benefit of priority of, and incorporates by reference in its entirety, Chinese Application No. 201611141091.6, titled "METHOD AND APPARATUS FOR OBJECT," filed Dec. 12, 2016.

BACKGROUND

Technical Field

The disclosure relates to the field of network communications, and in particular to a method and a device for controlling the timing of network allocation within a communications network.

Description of Related Art

A communication scenario is used as an example. In an example of a communication scenario, one or more clients and server are provided, wherein each client is provided with an object set corresponding to the client and the object set comprises objects to which the client belongs. For example, the objects may be communication resources in the communication scenario. Each client may allocate at least part of the objects to other clients by sending an object allocation message to the server. As such, when the objects are communication resources, a rational allocation for the communication resources can be achieved through the above-mentioned process, such that each network node can acquire adequate communication resources, thereby improving the communication efficiency of the entire communication network and avoiding an occurrence of communication blocking at some network nodes.

However, a time factor for an object allocation operation is not taken into consideration in current systems, and initiatively determining an execution time of the object allocation operation by an allocation source may lead to an irrational object allocation time. For example, an allocated object may not be applied in time if the object allocation operation is performed prematurely, which leaves the resources unused; while blocking of communication may have already occurred at a corresponding client if the object allocation operation is performed too late, which causes reduction in the communication efficiency.

BRIEF SUMMARY

Because of these deficiencies, the disclosure provides methods, systems, and devices for object allocation through which user operations can be simplified and the punctuality of object allocation operations can be improved.

In order to achieve the above-mentioned purpose, the disclosure provides the following technical solutions.

In one embodiment, a method is disclosed comprising receiving, at a server, an object allocation message submitted by an allocation source via a communications application, the object allocation message including an identification of the allocation source, a number of to-be-allocated objects, and an object allocation time; extracting, by the server from an object set corresponding to the allocation source, objects corresponding to the number of to-be-allocated objects; controlling, by the server, acquisition times when the allocation destination will acquire the objects, so that the acquisition times do not happen before the object allocation time.

In another embodiment, a method is disclosed comprising receiving, at a client device of an allocation destination, an acquisition notification from a server, the acquisition notification including an object allocation time configured by an allocation source, wherein the acquisition notification is used to allocate objects from the allocation source to the allocation destination; if the object allocation time has not occurred, restricting, at the client device, a trigger permission of the allocation destination for the acquisition notification; if the object allocation time has occurred, granting, at the client device, the trigger permission of the allocation destination for the acquisition notification; and when the trigger permission has been granted, sending, by the client device, an object acquisition request to the server according to a detected trigger operation performed on the acquisition notification, so as to acquire at least part of the objects.

In another embodiment, a device is disclosed comprising a processor; and a storage medium for tangibly storing thereon program logic for execution by the processor, the stored program logic comprising: logic, executed by the processor, for receiving an object allocation message submitted by an allocation source via a communications application, the object allocation message including an identification of the allocation source, a number of to-be-allocated objects, and an object allocation time; logic, executed by the processor, for extracting, from an object set corresponding to the allocation source, objects corresponding to the number of to-be-allocated objects; logic, executed by the processor, for controlling acquisition times when the allocation destination will acquire the objects, so that the acquisition times do not happen before the object allocation time.

It can be appreciated from the above technical solutions that in the disclosure, by configuring the object allocation time through the client, acquisition times when the allocation destination acquires the objects to be allocated can be accurately restricted, so the acquisition times do not happen before the object allocation time, thereby improving the controllability and the punctuality of the object allocation operation.

DETAILED DESCRIPTION

Figure 1:
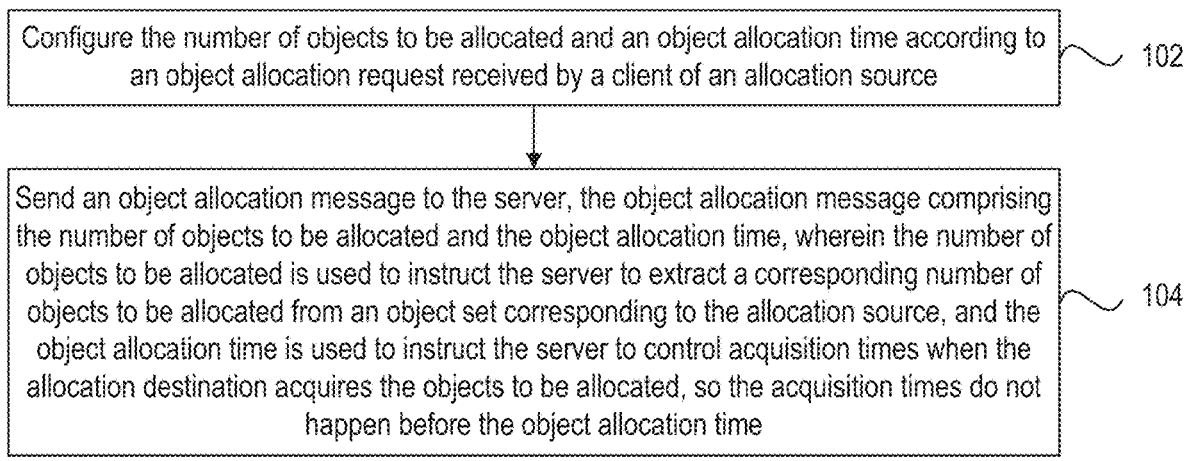
FIG. 1 is a flow diagram illustrating a method for object allocation based on an allocation source according to some embodiments of the disclosure.

FIG. 1 is a flow diagram illustrating a method for object allocation based on an allocation source according to some embodiments of the disclosure. As shown in FIG. 1, the method is applied to a client of a communication application and a registered account of an allocation source is logged into the client (i.e., the method is applied to a client corresponding to the allocation source). The method may comprise the following steps.

Step 102: configure the number of objects to be allocated and an object allocation time according to an object allocation request received by a client of an allocation source.

In one embodiment, the type of the communication application is not limited in the disclosure. For example, the communication application may be an instant communication application, such as an Enterprise Instant Messaging (EIM) application (e.g., DINGTALK).

In one embodiment, an electronic apparatus may be configured as a client of the communication application corresponding to a user by installing a client application of the communication application on the electronic apparatus and logging in with a registered account of the user at the communication application. The electronic apparatus may be a mobile apparatus such as a cellphone, a tablet, etc. Alternatively, the electronic apparatus may also be a non-mobile electronic apparatus such as a PC host computer, etc, which is not limited in the disclosure. In one embodiment, if an on-line "client" such as HTML5 technology is used, the above client can run on the electronic apparatus without installing a corresponding application on the electronic apparatus.

In this case, when any user (via the client of the above communication application) allocates his/her own objects to other users, this user is considered as "the allocation source." Conversely, a user to which the objects are allocated is considered as "the allocation destination.". Certainly, when another user allocates their own objects to another user, the other user is considered as "the allocation source" while the opposite user is considered as "the allocation destination." Hence, "the allocation source" and "the allocation destination" in the disclosure merely indicate identity types instead of necessarily referring to a certain user or certain users, which will be determined depending on a change in actual conditions.

In one embodiment, an object allocation request may include a number set by the allocation source manually. For example, the allocation source may input a number in a display interface of the client, so the allocation source client can accordingly configure the number of objects to be allocated.

In another embodiment, the allocation source client may display a configuration page. When a number recommendation function of the configuration page is in an enabled state, the client may generate a recommendation number that satisfies a predefined number recommendation rule as the number of objects to be allocated. In this embodiment, any form of number recommendation rules may be used. For example, the number recommendation rule may be a random recommendation rule by which the client calculates a random number in accordance with a predefined random or pseudo-random algorithm. Certainly, a numerical range of the random number may be further limited, to ensure that the numerical range does not exceed an acceptable range of the allocation source. For example, the range may not exceed the number of objects that are owned by the allocation source. Alternatively, or in conjunction with the foregoing, the range may not exceed the number of objects that the allocation source wants to allocate. In another embodiment, the number recommendation rule may be a proportion recommendation rule by which the client multiples a total number of all objects of the allocation source by a preset proportion and uses the resultant number as the recommendation number.

In one embodiment, the allocation source may initiate an object allocation request in a communication session in which the allocation source takes part. The client may then automatically configure all peer users of the communication session as the allocation destination, wherein the communication session may be a single chat communication session or a group chat communication session. However, in some cases, when the allocation source divides (e.g., equally or randomly) the objects to be allocated into several subsets and the number of the subsets is less than the number of all peer users of the communication session, these peer users need to compete for a limited number of subsets. The client only grants a permission for participating in competition to all peer users, only peer users that succeed in the competition belong to the above allocation destination, while peer users that fail in the competition do not belong to the allocation destination.

In another embodiment, when the allocation source initiates an object allocation request in a group chat communication session in which the allocation source participates, the allocation source may further select a peer from all peer users. The client may then configure the selected peer user as the allocation destination, while not configuring the unselected peer users as the allocation destination. Thus, the unselected peer users cannot acquire objects allocated by the allocation source.

In one embodiment, an object allocation request may comprise a time manually set by the allocation source. For example, the allocation source may input the time in the display interface of the client, so the client can configure the object allocation time.

In another embodiment, the allocation source client may display a configuration page. When a time recommendation function of the configuration page is in an enabled state, the client may generate a recommendation time that satisfies a predefined time recommendation rule as the object allocation time.

In one embodiment, the time recommendation rule may comprise a recommendation condition for a first characteristic numerical value. Then, the allocation source client may generate the recommendation time with each of time positions being the first characteristic numerical value. The time positions refer to "hour," "minute," "second," "millisecond," etc. that constitute the recommendation time. For example, when the recommendation time is "18:18:18," time positions included in the recommendation time are "hour," "minute," and "second," and the numerical values of each time position are all 18. As another example, when the recommendation time is "9:59:59:999," time positions included in the recommendation time are "hour," "minute," "second," and "millisecond," and numerical values of the time positions are 9, 59, 59, and 999, respectively. The first characteristic numerical value may be a numerical value with a greater user tendency and preference. The related art provides a solution of manually setting time information by the allocation source, so the server grants an acquisition permission of the allocation destination for the objects to be allocated at the time indicated by the time information. Then, the server may obtain the above first characteristic numerical value (e.g., 6, 8, 9 . . . 59, and 66 . . . 999, etc.) by acquiring historical configuration data for the time information in the related art and performing statistical processing. When the above first characteristic numerical value is used, due to the greater user preference to the first characteristic numerical value, the allocation destination is enabled to memorize the recommendation more easily and recall related events more readily when it is the recommendation time, which makes corresponding objects to be allocated requested and acquired in time, helping to improve the object allocation efficiency.

In another embodiment, the time recommendation rule may comprise a discarding condition for a second characteristic numerical value. Then, the allocation source client may generate the recommendation time with each of time positions being avoided from using the second characteristic numerical value. The second characteristic numerical value may be a numerical value that the user does not want to use. For example, the server may similarly obtain the above second characteristic numerical value by analyzing the above historical configuration data and performing statistical processing. For example, it is easy for user to mistake some numerical values (e.g., numerical value 1 and numerical value 7 etc.) due to their similar shapes. For example, when there are multiple allocation destinations, if an allocation destination mistakenly takes a time "16:11:18" as "16:17:18," the objects to be allocated may be caused to be completely acquired by other allocation destinations at a time between "16:11:18" and "16:17:18," thereby influencing the rational allocation of the objects to be allocated.

In another embodiment, the allocation source client may receive a prompt message sent by the server. The prompt message may comprise date information related to any of associated users of the allocation source. Then, when the time recommendation rule comprises an application condition for the date information, the recommendation time related to the date information (e.g., a fixed or dynamically determined time in the date corresponding to the date information) is generated if a response operation for the prompt message is detected. Further, any of associated users may also be considered as the allocation destination, to perform an object allocation operation for the any of associated users based on the technical solution of the disclosure. As such, the allocation source may directly initiate an object allocation operation for any of associated users based on the prompt message sent by the server, without initiatively triggering the object allocation, which facilitates simplifying operations of the allocation source.

In this embodiment, when the object allocation request is initiated for any group to which the allocation source belongs, the client may determine a corresponding recommendation time that has been used, according to the object allocation message sent by other group members in the any group to the server. Then, generate a recommendation time that satisfies the time recommendation rule and differs from the recommendation time that has been used. This prevents the allocation destination from being affected in acquiring the objects to be allocated corresponding to each of group members when multiple group members use the same recommendation time.

Step 104: send an object allocation message to the server, the object allocation message comprising the number of objects to be allocated and the object allocation time, wherein the number of objects to be allocated is used to instruct the server to extract a corresponding number of objects to be allocated from an object set corresponding to the allocation source, and the object allocation time is used to instruct the server to control acquisition times when the allocation destination acquires the objects to be allocated, so the acquisition times do not happen before the object allocation time.

In this embodiment, the allocation source client may determine festival information corresponding to a reception time of the object allocation request and acquire description information related to the festival information. Then, the allocation source client may record the description information in the object allocation message. Correspondingly, an allocation destination client may display the description information in a page related to acquisition of the objects to be allocated, so the allocation destination visually perceives and understands the corresponding festival information, achieving a function of prompting the allocation destination. In one embodiment, a page related to acquisition of the objects to be allocated may comprise: an object request page used for requesting, by the allocation destination, acquiring at least part of the objects to be allocated from the server; and a result display page for displaying results of the object request, etc.

Figure 2:
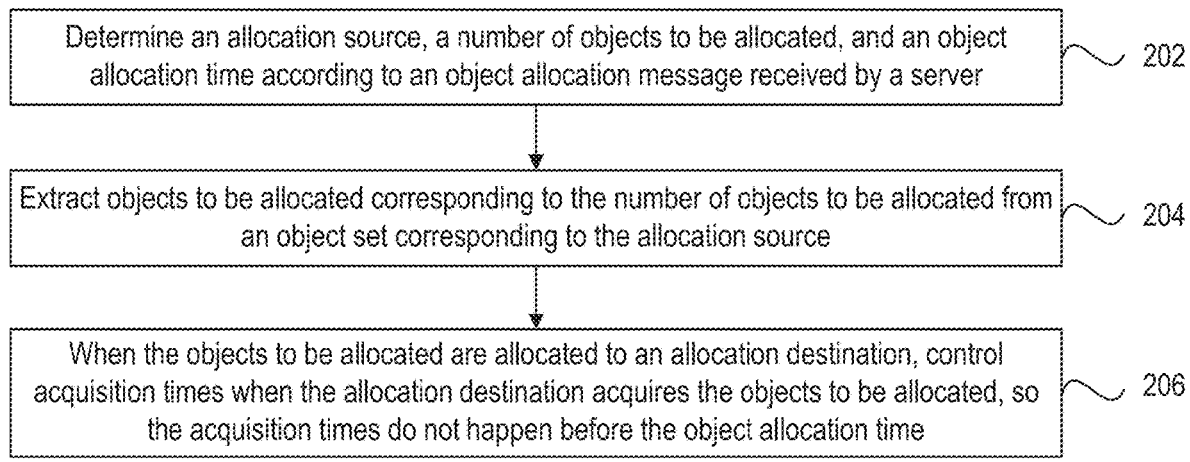
FIG. 2 is a flow diagram illustrating a method for object allocation based on a server according to some embodiments of the disclosure.

FIG. 2 is a flow diagram illustrating a method for object allocation based on a server according to some embodiments of the disclosure. As shown in FIG. 2, the method is applied to a server of a communication application, and the method may comprise the following steps.

Step 202: determine an allocation source, a number of objects to be allocated, and an object allocation time according to an object allocation message received by a server.

Step 204: extract objects to be allocated corresponding to the number of objects to be allocated from an object set corresponding to the allocation source.

Step 206: when the objects to be allocated are allocated to an allocation destination, control acquisition times when the allocation destination acquires the objects to be allocated, so the acquisition times do not happen before the object allocation time.

In one embodiment, after the object allocation message is received and when delaying till object allocation time, the server sends a first acquisition notification for the objects to be allocated to an allocation destination client, the first acquisition notification used to instruct the allocation destination client to respond to a trigger operation for the first acquisition notification without delay. For example, after receiving the object allocation message, the server parses the object allocation time (i.e., "x:y:z") from the object allocation message (x, y, and z may be any identical or different numerical values that satisfy the time recommendation rule). Then the server cannot send the first acquisition notification to the allocation destination until it is the object allocation time. After receiving the first acquisition notification at the client, the allocation destination may immediately acquire the objects to be allocated by triggering the first acquisition notification, to control the acquisition times when the allocation destination acquires the objects to be allocated to not happen before the object allocation time. The "delay" should be understood as the server or the client "purposely" or "initiatively" delaying execution times of related operations, but does not include a "slow" response caused by the shortage in computing processing performance and data transmission performance of the server or the client.

In another embodiment, after receiving the object allocation message, the server may send a second acquisition notification for the objects to be allocated to the allocation destination client without delay. In one embodiment, the second acquisition notification comprises the object allocation time and being used to instruct the allocation destination client to grant a trigger permission of the allocation destination for the second acquisition notification when delaying till it is the object allocation time. In other words, the client of the object destination may receive the second acquisition notification before the object allocation time, and the allocation destination does not have the trigger permission for the second acquisition notification before the object allocation time, not until it is the object allocation time, so the acquisition times when the allocation destination acquires the objects to be allocated are controlled to not occur before the object allocation time.

In another embodiment, after receiving the object allocation message, the server may send to the allocation destination client a third acquisition notification for the objects to be allocated without delay, and grant an acquisition permission of the allocation destination for the objects to be allocated when it is the object allocation time. That is, the allocation destination client may receive the third acquisition notification before the object allocation time and the allocation destination may also trigger the third acquisition notification. But since the client does not grant the acquisition permission, the allocation destination cannot acquire the objects to be allocated before the object allocation time, so the acquisition times when the allocation destination acquires the objects to be allocated are controlled to be not happening before the object allocation time.

In this embodiment, when object allocation messages sent by multiple group members in the same group for the group respectively are received and object allocation times corresponding to multiple object allocation messages are identical, the server may retain the object allocation message having a maximum number of objects to be allocated and cancel processing of other object allocation messages in the multiple object allocation messages. This prevents the allocation destination from being affected in acquiring the objects to be allocated corresponding to each of group members when multiple group members use the same object allocation time, thereby facilitating improving the object allocation efficiency. Certainly, each of group members can edit "the number of objects to be allocated" corresponding to the group member, for example, by maximizing "the number of objects to be allocated" corresponding to the group member, to acquire "a permission" for performing object allocation at a corresponding object allocation time, i.e., "bidding" for the same object allocation time is achieved. Similarly, each of group members may also edit "the object allocation time" corresponding to the group; for example, modify "the object allocation time" as a time that has not been used by others.

Figure 3:
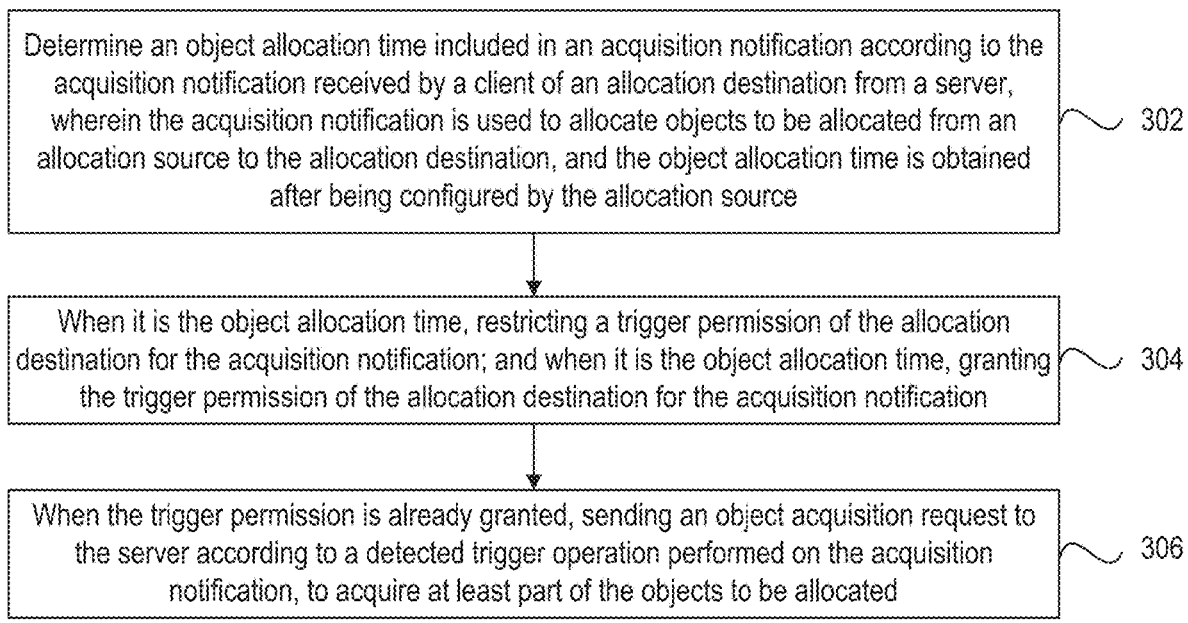
FIG. 3 is a flow diagram illustrating a method for object allocation based on an allocation destination according to some embodiments of the disclosure.

FIG. 3 is a flow diagram illustrating a method for object allocation based on an allocation destination according to some embodiments of the disclosure. As shown in FIG. 3, the method is applied to a client of a communication application and a registered account of an allocation destination is logged into the client (i.e., the method is applied to a client corresponding to the allocation destination). The method may comprise the following steps.

Step 302, determining an object allocation time included in an acquisition notification according to the acquisition notification received by a client of an allocation destination from a server, wherein the acquisition notification is used to allocate objects to be allocated from an allocation source to the allocation destination, and the object allocation time is obtained after being configured by the allocation source.

Step 304, when it is the object allocation time, restricting a trigger permission of the allocation destination for the acquisition notification; and when it is the object allocation time, granting the trigger permission of the allocation destination for the acquisition notification.

Step 306, when the trigger permission is already granted, sending an object acquisition request to the server according to a detected trigger operation performed on the acquisition notification, to acquire at least part of the objects to be allocated.

In this embodiment, when receiving the acquisition notification, the allocation destination client may display a corresponding reminder page comprising a reminder setting option. Then, when detecting that the reminder setting option is triggered, the allocation destination client may create a reminder message for the acquisition notification, wherein a reminder time of the reminder message precedes the object allocation time by a first preset time period, and a reminder object is the allocation destination. That is, the allocation destination is reminded before it is the object allocation time. This is especially helpful when an interval between the current time and the object allocation time is long. Setting a reminder message near the object allocation time may facilitate providing in-time reminding of the allocation destination, such that the allocation destination only needs to pay attention to the arrival of the object allocation after receiving the reminder message, thereby decreasing as much as possible the impact on other matter that the allocation destination processes and operates. The reminder page may display a corresponding object allocation time or countdown for the object allocation time, to facilitate quick viewing by the allocation destination.

In this embodiment, when the current time precedes the object allocation time by a second preset time period, the allocation destination client may display a countdown icon for the object allocation time on other displayed content of the allocation destination client in a superimposed fashion, until it is the object allocation time. This visually and clearly shows that the object allocation time is forthcoming, helping to attract the attention of the allocation destination. In this way, the allocation destination is more concerned about the arrival of the object allocation time, to send the object acquisition request to the server in time to obtain the corresponding objects to be allocated.

In this embodiment, the allocation destination client may display an entry icon within the allocation destination client. When the entry icon is detected to be triggered, the client displays a corresponding notification list comprising all received acquisition notifications of which corresponding object allocation times have not expired. As such, when the notification list is folded up, other displayed content may be avoided from being hidden, thereby preventing an influence on the processing of other matters by the allocation destination. Moreover, when the notification list is displayed, the allocation destination may be enabled to quickly acquire all acquisition notifications to improve the information (i.e., there are the acquisition notifications of which the object allocation times have not expired) acquisition efficiency. Further, a corresponding object allocation time or countdown for the object allocation time may be displayed in a display area of each of acquisition notifications in the notification list, to facilitate quick viewing by the allocation destination.

It can be appreciated from the above technical solutions that in the disclosure, by configuring the object allocation time through the client, acquisition times when the allocation destination acquires the objects to be allocated can be accurately restricted, so the acquisition times do not happen before the object allocation time, thereby improving the controllability and the punctuality of the object allocation operation.

The technical solutions of the disclosure may be applied to various types of object allocation scenarios, which is not limited in the disclosure. For example, in one embodiment, the technical solutions of the disclosure may be applied to a communication scenario in which communication resources may be interpreted as the above objects, while the communication resources may be allocated between network nodes configured as the client in a communication network, according to the technical solutions of the disclosure, so the communication resources of a certain network node are allocated to other network nodes more punctually. In another embodiment, the technical solutions of the disclosure may be applied to an application scenario. For example, the above objects may be interpreted as virtual gifts, electronic red envelopes, and virtual resources etc. By taking an electronic red envelope as an example, a more punctual electronic red envelope sending operation may be achieved based on the technical solutions of the disclosure. Certainly, the technical solutions may also be applied to other scenarios, which is not limited in the disclosure.

For ease of understanding, an object in the form of "an electronic red envelope" is taken as an example and the object allocation solutions of the disclosure are detailed for a "sending red envelopes" scenario.

Figure 4:
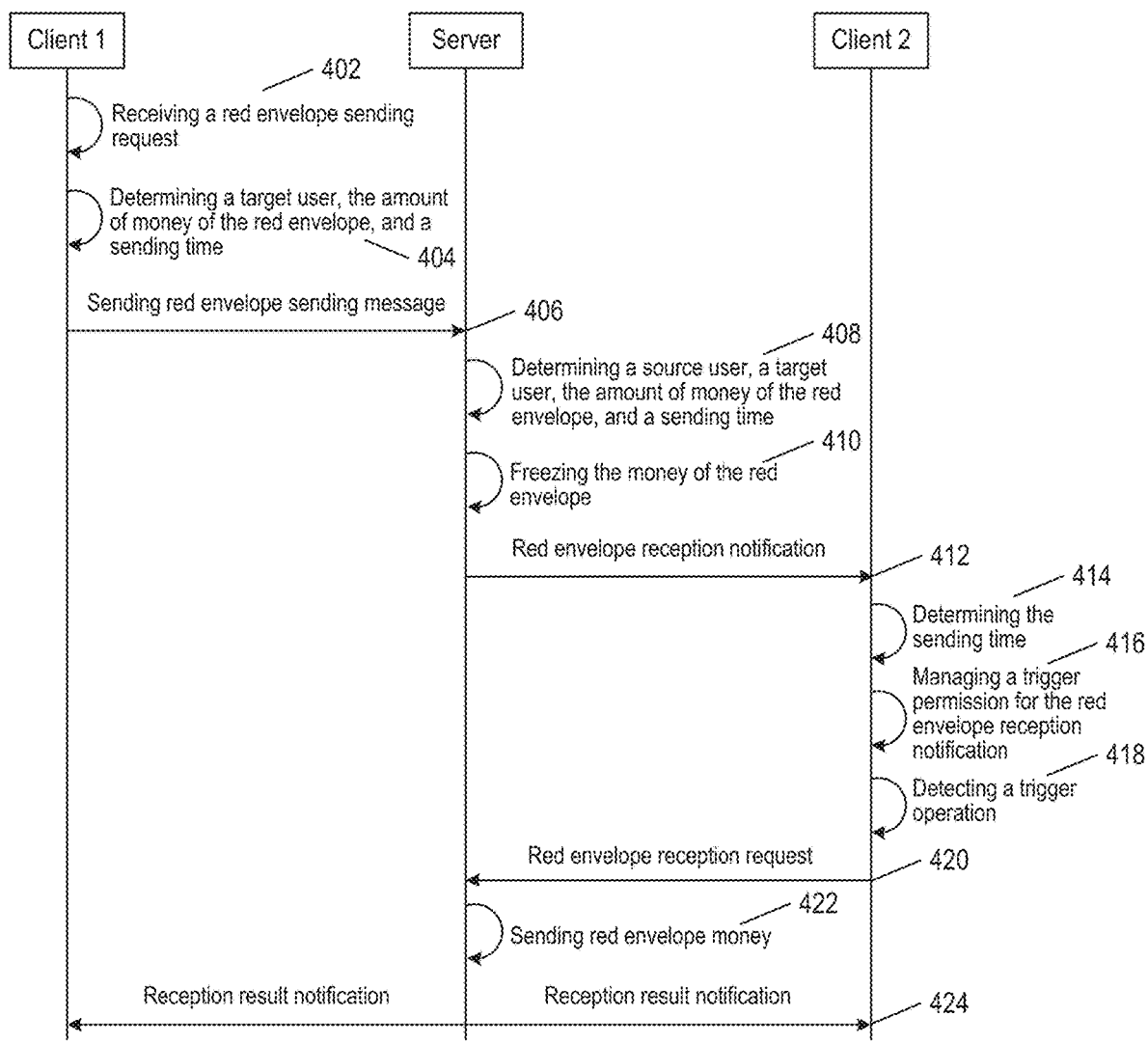
FIG. 4 is a flow diagram illustrating a method for object allocation according to some embodiments of the disclosure.

FIG. 4 is a flow diagram illustrating a method for object allocation according to some embodiments of the disclosure. As shown in FIG. 4, assuming that a user A uses a client 1 of an enterprise instant messaging application (e.g., "DING TALK") and a user B uses a client 2, when the user A sends a red envelope (i.e., an electronic red packet) to the user B through the client 1, the user A is equivalent to the allocation source in the disclosure and the user B is equivalent to the allocation destination in the disclosure. As such, through interaction processes among the client 1, a server (i.e., a DING TALK server), and the client 2, an object allocation process described below is achieved.

Step 402, receiving, by the client 1, a red envelope sending request (equivalent to the object allocation request described above).

Figure 5:
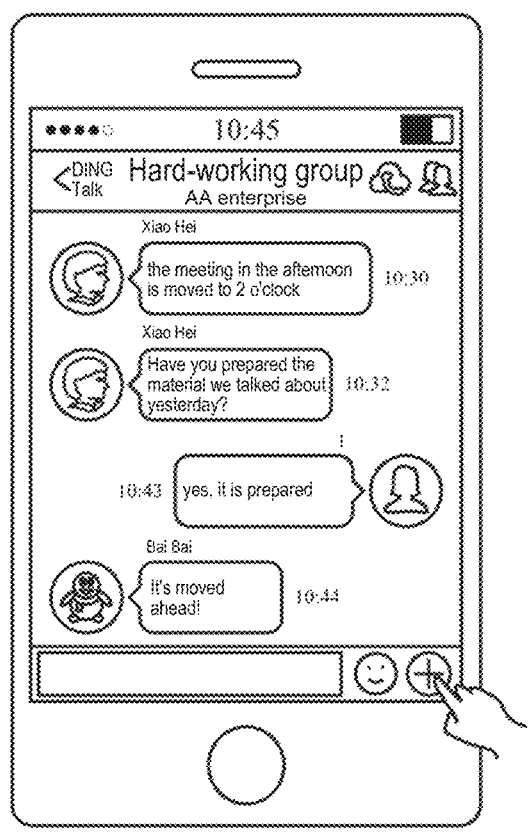
FIGS. 5-24 are user interface diagrams of a page for sending a red envelope according to some embodiments of the disclosure.
Figure 6:
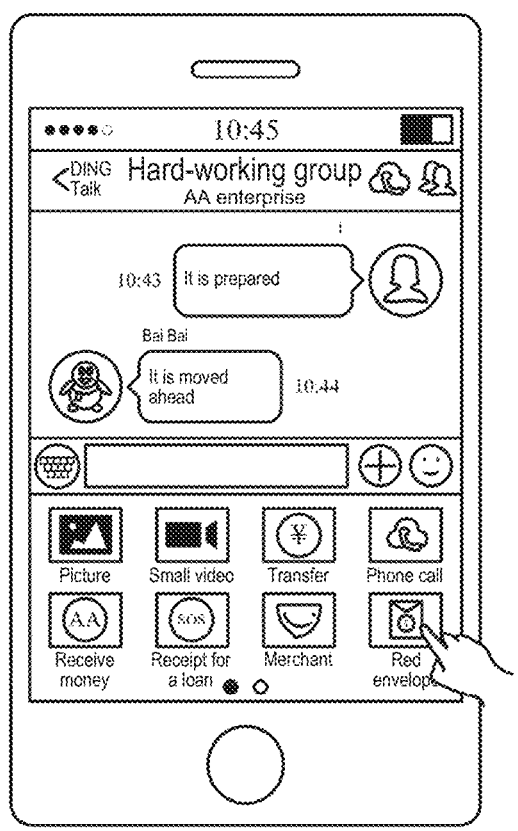
Figure 7:
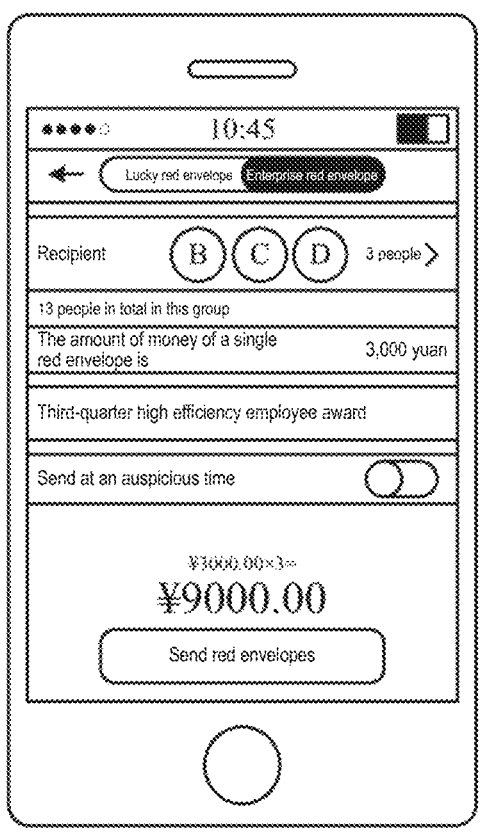

In one embodiment, as shown in FIG. 5, assuming that the user A operates in a communication session page corresponding to "a hard-working group" to which the user A belongs, for example, the user A may click a "s" (plus) icon on the lower right side of the communication session page shown in FIG. 5 to call menu options positioned on the bottom of the communication session page as shown in FIG. 6. The menu options comprise function entries such as "picture," "small video," "transfer," "phone call," and "red envelope," etc. After the user A selects the "red envelope" function entry in FIG. 6, the view may switch to a red envelope configuration page as shown in FIG. 7. As shown in FIG. 7, when the user A uses an "enterprise red envelope" type, the user A may select several group members (B, C, and D) that the user A wants to send red envelopes to from all 13 members (13 is given as an example) in the "hard-working group." For example, FIG. 7 shows that the user A selects a group member B, a group member C, and a group member D as "recipients," i.e., objects to which the red envelopes are sent. In addition, the user A may also manually configure "an amount of money of a single red envelope" as 3,000 yuan, then the amount of money of the red envelopes are 3,000×3=9,000 yuan. The user A may also manually input description content for related red envelopes, for example "Third-quarter high efficiency employee award," to distinguish different red envelopes from each other.

Figure 8:
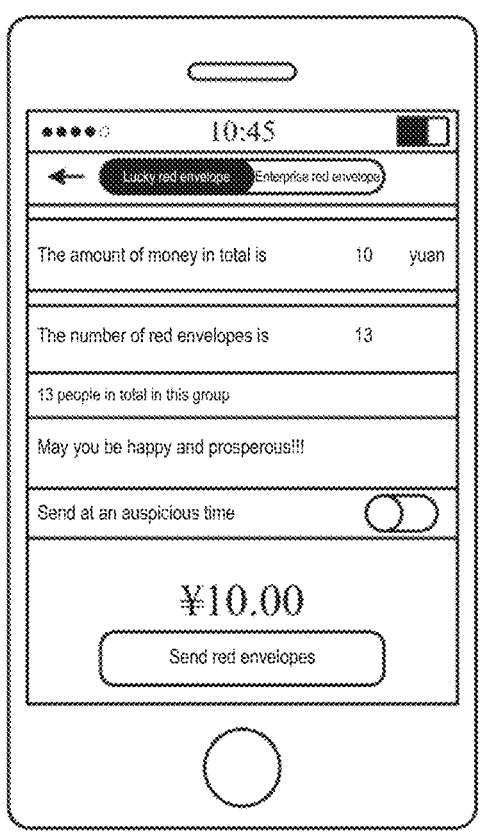

Certainly, in addition to the "enterprise red envelope," the disclosure may also be applied to other arbitrary types of red envelopes. For example, as shown in FIG. 8, when the user A selects a "lucky red envelope," all group members in the "hard-working group" are automatically added as objects to which the red envelope is sent. The user A may manually configure the amount of money of the red envelope as 10 yuan and the description content as "may you be happy and prosperous!!!" etc. As another example, when the user A triggers, for example, the "red envelope" function entry as shown in FIG. 6 in a page of a single chat communication session between the user A and the user B, the user B, as the unique peer user, may also be automatically configured as an object to which the red envelope is sent, without being manually configured by the user A.

Figure 9:
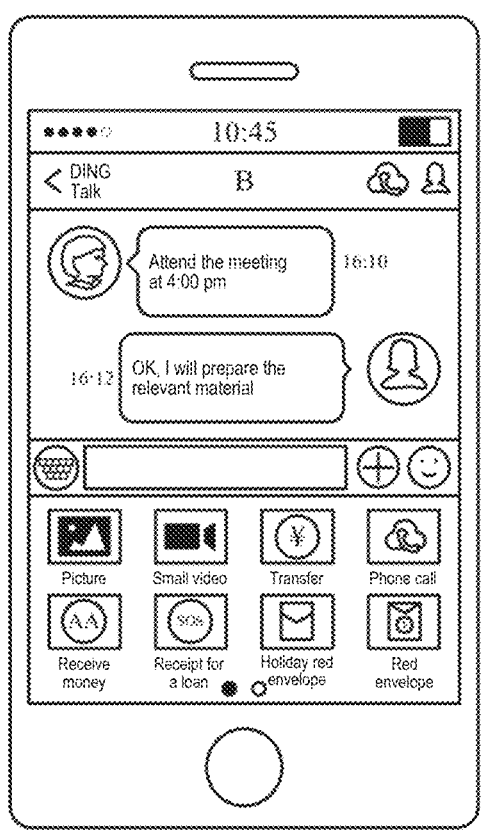

In another embodiment, when the client supports various types of red envelope sending solutions, a function entry corresponding to each of the red envelope sending solutions may be provided in the menu options as shown in FIG. 6, respectively. For example, as shown in FIG. 9, in the page of the single chat communication session between the user A and the user B, the menu options respectively comprise the "holiday red envelope" function entry and the "red envelope" function entry, which correspond to different forms of red envelope sending solutions, respectively. In this case, the user A may select a suitable function entry according to a red envelope sending solution that is desired to be applied actually, to achieve a corresponding red envelope sending operation, as described in the examples below.

Figure 10:
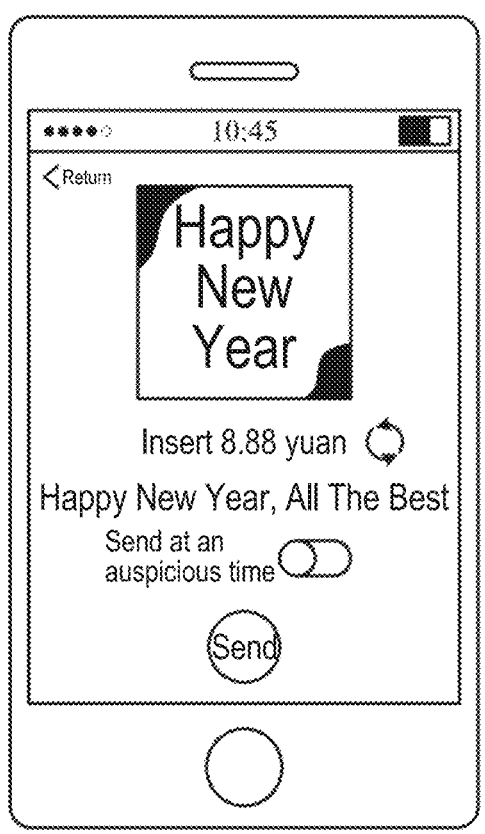

When the user A triggers the "holiday red envelope" function entry shown in FIG. 9, the view may jump to the red envelope configuration page shown in FIG. 10, which can be used for the user A to configure parameters such as the amount of money of a red envelope, etc. However, since there is only a unique peer user, i.e., the user B, the user B is defaulted to be a target user and cannot be modified. It is noted that configurable parameters in FIG. 10 include description information related to festival information; for example, if the current time is a holiday or near the holiday, e.g., assuming that the festival is "New Year," the description information corresponding to "New Year" may include a picture of "Happy New Year" and textual description content of "Happy New Year, All The Best" etc. as shown in FIG. 10. Similarly, if the current time is "Christmas Day" or near "Christmas Day," the corresponding description information may include a picture, a text, etc. related to "Christmas Day." Certainly, the "holiday red envelope" or other types of red envelopes are also applicable to an application scenario such as a group chat communication session page shown in FIGS. 5-6, and are not limited to the application scenario of the single chat communication session page as shown in FIG. 9.

Figure 11:
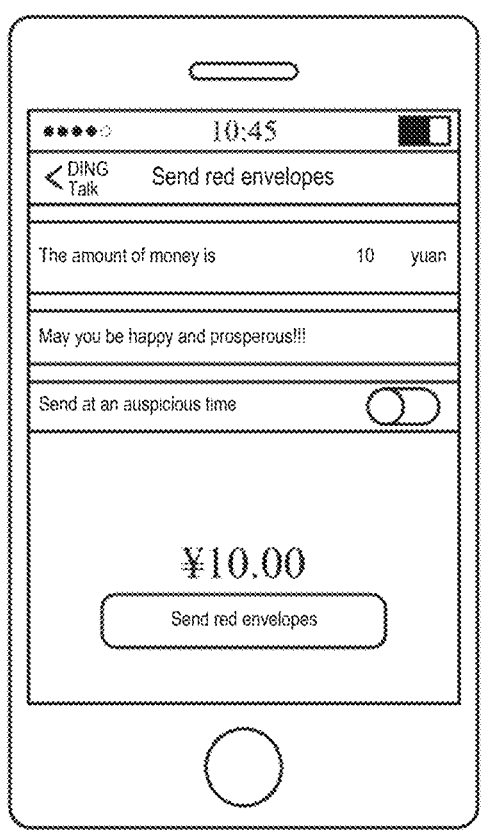

When the user A triggers the "red envelope" function entry shown in FIG. 9, the view may jump to the red envelope configuration page shown in FIG. 11, which can be used for the user A to configure parameters such as the amount of money of a red envelope, etc. Moreover, since there is only a unique peer user, i.e., the user B, the user B is defaulted to be a target user and cannot be modified. The red envelope configuration page shown in FIG. 11 does not include the above description information related to the festival information, in order to distinguish from the above "holiday red envelope." The description of other parameters will not be repeated here.

In another embodiment, the user A does not need to manually trigger the above "red envelope" function entry and the "holiday red envelope" function entry etc., but achieves sending of a red envelope by other methods. In this case, the server may acquire information of users associated with the user A, e.g., since the user A and the user B are in a relationship of enterprise colleges, the server may acquire information such as date of birth, date of enrollment etc. of the user B, as date information related to the user B. Next, when the date indicated by the date information related to the user B is forthcoming, e.g., three days before the date of birth or anniversary of enrollment of the user B, the server may send a prompt message regarding the date information related to the user B (such as the date of birth or anniversary of enrollment) to the user A, so the prompt message is displayed on the client 1 used by the user A. For example, as shown in FIG. 10, the server may send the above prompt message to the client 1 through an "anniversary prompt" communication session. In this case, when a trigger operation performed by the user A on a "send blessings" option in the prompt message is detected, sending a red envelope to the user B may be achieved by switching to, for example, the red envelope configuration page as shown in FIG. 11.

Figure 12:
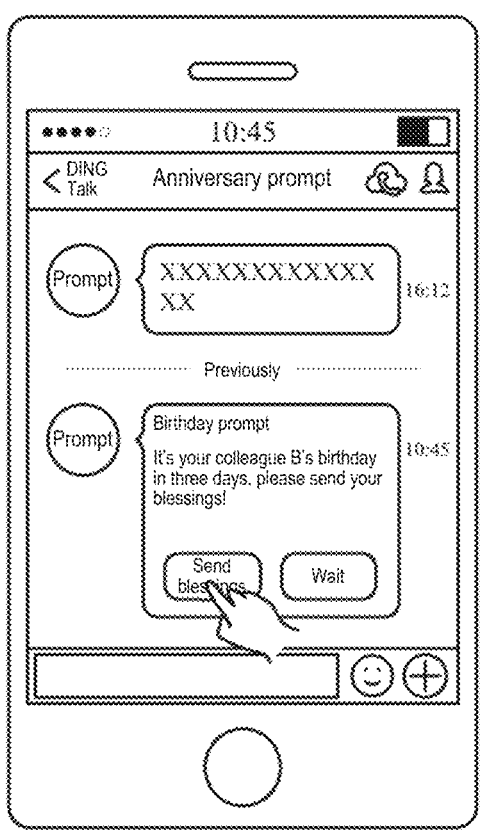

In this embodiment, the user A may go to the red envelope configuration page by, for example, the above method, to achieve a configuration operation performed on preset parameters and a sending operation performed on a red envelope. However, the "red envelope sending request" may be understood in many ways in different scenarios. In one embodiment, when the trigger operation performed by the user A on the "red envelope" and "holiday red envelope" function entries etc. as shown in FIG. 9 or the "send blessings" option as shown in FIG. 12 is detected, the client 1 may understand that the red envelope sending request is detected. Subsequently, parameters such as the target user and the amount of money of the red envelope etc. may be determined by manual configuration made by the user A or by automatic determination made by the client 1. In another embodiment, when the user A completes parameter configuration in the above red envelope configuration page and triggers the "send" option shown in FIG. 10 or the "send red envelopes" option shown in FIG. 11, the client 1 may understand that the red envelope sending request is detected, and all parameters that need to be understood may be determined at this time. In another embodiment, when the user A triggers the "send blessings" option in the prompt message shown in FIG. 12, the client 1 may understand that the red envelope sending request is detected. Certainly, the "red envelope sending request" may also be understood in many other ways, which is not limited in the disclosure.

It is noted that in the red envelope configuration page, the user A may also configure other arbitrary types of parameters in addition to the parameters described above, which is not limited in the disclosure. By taking the red envelope configuration page shown in FIG. 8 as an example, the red envelope configuration page may comprise a "the number of red envelopes" option, then the user A may control the red envelope allocation operation of the server by setting "the number of red envelopes." For example, when the number of red envelopes is 13, it can be ensured that red envelope money with a total amount of "10 yuan" is averagely or randomly divided into 13 parts, for allocation to 13 group members as the allocation destinations.

Step 404, determining, by the client 1, the target user (equivalent to the allocation destination in the disclosure), the amount of money of the red envelope (equivalent to the objects to be allocated in the disclosure), and a sending time (equivalent to the recommendation time in the disclosure).

1. The Target User

In regard to the scenario of the single chat communication session between the user A and the user B, since there is only a unique peer user, i.e., the user B, as shown in FIG. 11, the client 1 may consider the user B as the target user by default, without manual configuration by the user A.

In regard to the scenario of the group chat communication session corresponding to the "hard-working group" to which the user A and the user B belong, there are multiple peer users. In one embodiment, as shown in FIG. 8, the client 1 may add all group members in the "hard-working group" as the target users by default, without manual configuration by the user A. In another embodiment, as shown in FIG. 7, the user A may manually make a selection from all group members in the "hard-working group," and configure selected user B, user C, and user D as the target users.

In the case of the scenario of the group chat communication session, for example, when the number of red envelopes configured by the user A through "the number of red envelopes" option shown in FIG. 8 is less than the number of group members in the "hard-working group," the client 1 can only grant a permission for "grabbing" red envelopes to all group members in the "seriously working group" and the server carries out a competition (i.e., grabbing red envelopes) among all group members in accordance with a first come first served competition rule, for example, and then the group members that get the red envelopes are the target users described above (the server needs to allocate corresponding red envelope money to the target users), while the group members that do not get the red envelopes are not the target users (the server does not need to allocate red envelope money to them).

2. The Amount of Money of Red Envelopes

In one embodiment, the user A may manually configure the amount of money of the red envelope. For example, in the red envelope configuration page shown in FIG. 7, the user A may configure the numerical value of "the amount of money of a single red envelope," then the amount of money of red envelopes is the total amount of money allocated to all "recipients," i.e., the amount of money of red envelopes in FIG. 7 is 9,000 yuan. In the red envelope configuration page shown in FIG. 8, the user A may configure the numerical value of "the total amount of money," the amount of money of red envelopes, i.e., the total amount of money is 10 yuan. In the red envelope configuration page shown in FIG. 11, the user A may configure the numerical value of "the amount of money," the amount of money of a red envelope, i.e., the amount of money is 10 yuan.

In another embodiment, the client 1 may automatically generate the amount of money of red envelopes. For example, when the client 1 displays the red envelope configuration page shown in FIG. 10, assuming that the number recommendation function in the red envelope configuration page related to the "holiday red envelope" is in an enabled state by default, the client 1 may initiatively generate a corresponding recommended amount of money (equivalent to the "recommendation number" in the disclosure) according to a predefined number recommendation rule, and use the same as the amount of money of the red envelope, for example, the amount of money of the red envelope in FIG. 10 may be 8.88 yuan. Certainly, if the user A is unsatisfied with the amount of money of the red envelope in the client 1, the user A may trigger an "update" icon on the right side of "stick 8.88 yuan" in FIG. 10, so the client 1 re-calculates and updates the amount of money of the red envelope.

Certainly, in other embodiments, it is also preferable to provide a recommended amount of money to the user A by the client 1; and if the user A is unsatisfied with the recommended amount of money provided by the client 1, the client 1 may further provide the user A with an input box for the user A to manually input a desired amount of money of the red envelope.

3. The Sending Time

In this embodiment, the client 1 may determine the sending time manually configured by the user A, according to the time configuration operation performed by the user A. Alternatively, the client 1 may automatically generate, according to a predefined time recommendation rule, a recommendation time that satisfies the time recommendation rule as the sending time herein, so the time when the user B receives the red envelope does not happen before the recommendation time. For example, when the recommendation time is "18:18:18," the user B should receive the red envelope as early as "18:18:18," but cannot receive the red envelope at "18:18:17" or other earlier times, thereby achieving the accurate control for the red envelope sending time.

Figure 13:
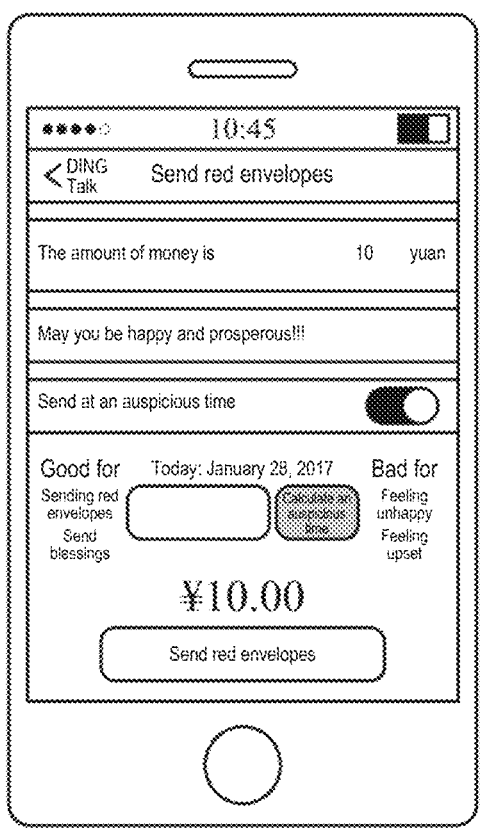
Figure 14A:
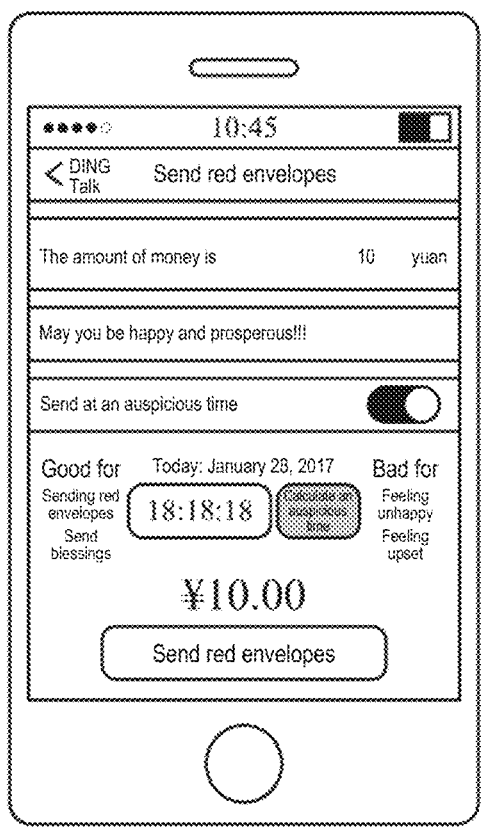

In another embodiment, the time recommendation rule may comprise a recommendation condition for a first characteristic numerical value. The first characteristic numerical value may be 6, 8, 9 etc. that a lot of users favor and are fond of, which are "lucky numbers," so the corresponding recommendation time becomes the so-called "auspicious time." For example, a "send at an auspicious time" option is included in each of the red envelope configuration pages as shown in FIGS. 7, 8, 10, and 11, etc. When the user A activates the "send at an auspicious time" option, the client 1 may initiatively generate the above recommendation time according to the technical solutions of the disclosure. Moreover, the recommendation time given in this embodiment may be an "auspicious time," so each of time positions in the recommendation time is the first characteristic numerical value, for example, the above recommendation time "18:18:18" comprises time positions of "hour," "minute," and "second" etc., each with a numerical value of 18. Certainly, different time positions in the recommendation time may be provided with different first characteristic numerical values; for example, in a recommendation time "10:18:18," the "hour" time position has a numerical value of 10, the "minute" time position and the "second" time position have a numerical value of 18. By taking the red envelope configuration page shown in FIG. 11 as an example, when the "send at an auspicious time" option is detected to be activated, a display box (shown as a blank display box in FIG. 13) and a "calculate an auspicious time" option shown in FIG. 13 may be displayed. Moreover, when a trigger operation performed on the "calculate an auspicious time" option is detected, a recommendation time "18:18:18" shown in FIG. 14A is displayed within the display box. Further, some related displayed information may be displayed surrounding the display box and the "calculate an auspicious time" option described above. For example, shown on the upper side may be the current date "today: Jan. 28, 2017," shown on the left side may be "good to send red envelopes and blessings," and shown on the right side may be "bad to be unhappy and fidgety," and these pieces of displayed information may vary with the current date or the current time.

In another embodiment, the time recommendation rule may comprise a discarding condition for a second characteristic numerical value. The second characteristic numerical value may be a numerical value such as three, four, seven, or the like that is unpleasant to a user, i.e., "unlucky number." In other words, in this embodiment, the second characteristic numerical value may be excluded from the recommendation time, so numerical values of all time positions of the recommendation time are the above first characteristic numerical value; as such, the resultant recommendation time is still an "auspicious time."

The user A may manually configure the client 1, to enable the client 1 to determine the above first and second characteristic numerical values, thereby achieving the automatic generation of the recommendation time. Alternatively, since a technical solution in which a user manually configures a sending time of a red envelope is present in the related art, the server may perform statistical processing on the historical configuration data of the user for the sending time, to configure a numerical value having a higher probability as the above first characteristic numerical value and a numerical value having a lower probability as the above second characteristic numerical value, according to application probabilities of the numerical values of each time position. Moreover, the first characteristic numerical value and the second characteristic numerical value are further pushed to the client 1, so the client 1 may accordingly generate a corresponding recommendation time.

In another embodiment, in the case of the embodiment shown in FIG. 12 where the client 1 has received the prompt message pushed by the server and the prompt message comprises the date information related to corresponding associated users, when the time recommendation rule comprises an application condition for the date information, if the client 1 has detected a response operation for the prompt message (e.g., the client 1 has detected that the "send blessings" option shown in FIG. 12 is triggered), the recommendation time related to the date information may be generated. For example, assuming that the current date is Jan. 28, 2017 and the birthday of the user B is Jan. 31, 2017, which is three days later than Jan. 28, 2017, then the recommendation time may be a certain time in the day of Jan. 31, 2017. For example, in one embodiment, the recommendation time may be a random time in the day of Jan. 31, 2017. In another embodiment, the recommendation time may be a specific time in the day of Jan. 31, 2017, e.g., "08:08:08 on Jan. 31, 2017." In another embodiment, the recommendation time may be a time in the day of Jan. 31, 2017 that satisfies "the recommendation condition for the first characteristic numerical value" or "the discarding condition for the second characteristic numerical value" described above, repeated descriptions will be omitted here.

When the user A is unsatisfied with the recommendation time displayed within the display box, the user A may re-trigger the "calculate an auspicious time" option, so the client 1 re-calculates another recommendation time, until a recommendation time that the user A is satisfied with is obtained. Certainly, the user A may also manually adjust and configure a desired recommendation time by a preset method such as triggering the display box, repeated descriptions will be omitted here.

In addition, in the scenario of a group chat communication session, since there are many group members in the same group, it is possible that all clients used by multiple group members recommend the same sending time, so the group members might ignore some of the red envelopes when receiving the red envelopes, such that not all red envelopes can be received in time. In this regard, taking the client 1 used by the user A as an example, assuming that the user A sends red envelopes within a group chat communication session page corresponding to the "hard-working group" to which the user A belongs. The client 1 may then initiate an inquiry to the server to know that the server has received the red envelope sending message sent by other group members in the "hard-working group," the red envelope sending message comprising recommendation times (i.e., recommendation times that have been used) generated by clients used by the other group members. Moreover, the client 1 may initiatively avoid these recommendation times that have been used when generating the recommendation time that satisfies the time recommendation rule, thereby ensuring that the sending times of all red envelopes within the same group are staggered as much as possible.

Figure 14B:
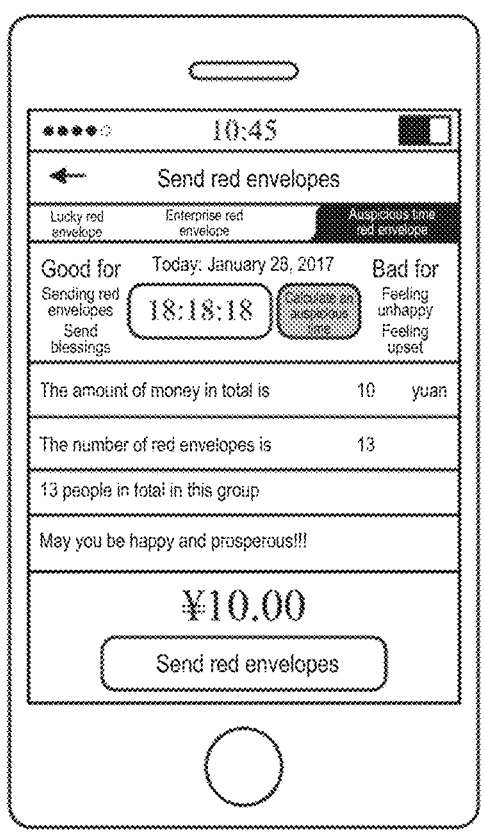

In addition, in the case of the embodiment shown in FIG. 8, in regard to the red envelope types of "lucky red envelope" and "enterprise red envelope" etc. provided in the related art, the disclosure may add the above "send at an auspicious time" option, so the "sending time" is included in the corresponding red envelope sending message by activating the "send at an auspicious time" option in the red envelope configuration pages corresponding to the "lucky red envelope" and the "enterprise red envelope" etc., i.e., the above "auspicious time red envelope" is obtained. Nevertheless, in addition to the use of the method of adding the "send at an auspicious time" option within the red envelope configuration page, a red envelope type juxtaposed with the red envelope types of "lucky red envelope" and "enterprise red envelope" etc. may also be separately provided. For example, a "auspicious time red envelope" type shown in FIG. 14B may be added. As such, when the user A selects a red envelope configuration page corresponding to the "auspicious time red envelope," the red envelope configuration page may directly include a display box, a "calculate an auspicious time" option, the current date "today: Jan. 28, 2017," "good to send red envelopes and send blessing" shown on the left side, "bad to be unhappy and fidgety" shown on the right side, and other displayed information similar to those in FIGS. 13 and 14A. Reference may be made to other red envelope configuration pages described above, and repeated descriptions will be omitted herein.

Step 406, sending, by the client 1, a red envelope sending message (equivalent to the object allocation message in the disclosure) to the server.

Step 408, determining, by the server, the source user (equivalent to the allocation source in the disclosure), the target user, the amount of money of the red envelope, and the sending time based on the received red envelope sending message.

In the illustrated embodiments, in order to solve the problem that multiple group members in the same group adopt the same recommendation time, the server may adopt the following method: when the red envelope sending messages sent by multiple group members in the same group for the group respectively are received and the recommendation times corresponding to multiple object allocation messages are identical, the red envelope sending message having a maximum amount of money of the red envelope is retained, and processing of other red envelope sending messages in these red envelope sending messages are canceled.

Further, the server may send a cancellation notification to the group member for whom red envelope sending message processing has been canceled, then the group member may, by triggering the cancellation notification, modify the amount of money of the red envelope in the original red envelope sending message and then retransmit the modified red envelope sending message to the server. Certainly, the server may not need to pay attention to the fact of whether the red envelope sending message is sent for the first time or sent after modification, but only needs to process the red envelope sending message as a newly received red envelope sending message, repeated descriptions will be omitted herein. Moreover, by performing the above process and only selecting red envelope sending messages having the same recommendation time and the maximum amount of money of the red envelope for processing, the corresponding multiple group members can compete for "the right to use" of this recommendation time; for example, when the recommendation time is a "auspicious time," the process can be taken as a "auspicious time bidding" event of the multiple group members.

Certainly, the group member that has received the cancellation notification may also modify the corresponding recommendation time of the red envelope sending message. Then, resend the modified red envelope sending message to the server. The server will process the modified red envelope sending message as a newly received red envelope sending message, repeated descriptions will be omitted herein.

Step 410, freezing, by the server, a corresponding amount of red envelope sending money (equivalent to the objects to be allocated in the disclosure) from a funds account (equivalent to the object set corresponding to the allocation source in the disclosure) corresponding to the client 1.

In the illustrated embodiment, the server may freeze the corresponding amount of red envelope sending money from the funds account corresponding to the client 1 in advance, to ensure that the target user can receive the corresponding red envelope money, thereby preventing the user A from transferring the money from the funds account after sending the red envelope and before the sending time. Alternatively, other methods may also be used for processing. For example, the red envelope sending money is transferred from the funds account corresponding to the client 1 to a third party payment platform for temporary storage. When the target user needs to receive the red envelope money, the user directly transfers corresponding red envelope money from the third party payment platform to the funds account corresponding to the target user.

Certainly, as most of source users will not transfer money out of the funds account after sending the red envelope and before the sending time, and even the lack of money only leads to a failure to receive the red envelope, and there is no problems such as financial security etc., it is not necessary to freeze or transfer the red envelope sending money in advance, so step 410 is not necessarily performed.

Step 412, sending, by the server, a red envelope reception notification (equivalent to the acquisition notification) to the client 2.

Step 414, determining, by the client 2, a corresponding sending time according to a received red envelope reception notification.

Step 416, managing, by the client 2, a trigger permission for the red envelope reception notification according to the sending time.

Step 418, detecting, by the client 2, a trigger operation for the red envelope reception notification after the trigger permission is granted.

Step 420, sending, by the client 2, a red envelope reception request (equivalent to the object acquisition request in the disclosure) to the server according to a detected trigger operation for the red envelope reception notification.

Step 422, sending, by the server, red envelope money to the client 2.

Step 424, sending, by the server, a reception result notification to the client 1 and the client 2, respectively.

In this embodiment, after receiving the red envelope sending message from the user A, the server sends, without delay, the red envelope reception notification for the to-be-sent red envelope money to the client 2 corresponding to the user B as the target user. The red envelope reception notification comprises a sending time generated by the client 1, so the client 2 restricts the trigger permission for the red envelope reception notification before the sending time. The trigger permission of the user B for the red envelope reception notification is granted when delay lasts until the sending time, so a red envelope reception request is sent to the server based on the trigger operation of the user B for the red envelope reception notification. In this way, through the above process, the client 2 may restrict a reception time when the user B receives corresponding red envelope money, such that the reception time is at least not earlier than the sending time included in the red envelope reception notification, thereby achieving the "send at an auspicious time" of the red envelope money. Similarly, when the user A selects multiple target users, clients of each of the target users may use a processing method similar to the processing method adopted in the client 2, repeated descriptions will be omitted herein. Descriptions will be made based on this embodiment in conjunction with the accompanying drawings.

Figure 15A:
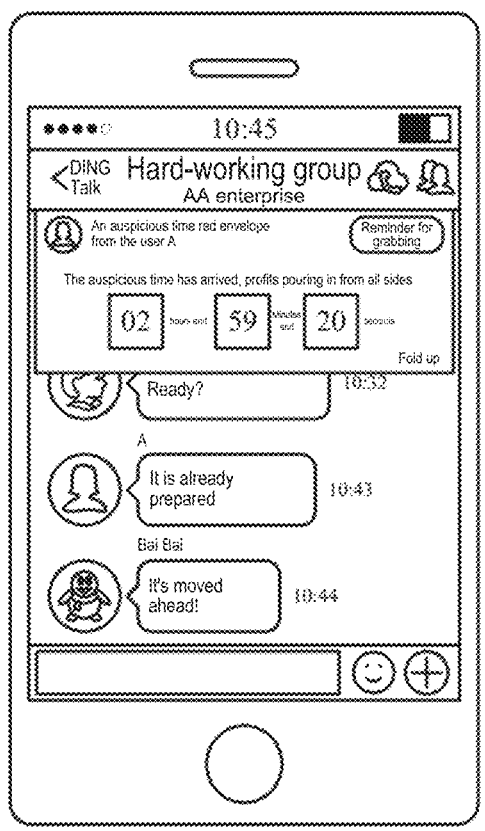

In this embodiment, when the client 2 receives the red envelope reception notification sent by the server, a reminder page as shown in FIG. 15A may be displayed. For example, the reminder page is displayed in a top area of the group chat communication session page of the "hard-working group" in a superimposed fashion in FIG. 15A. This facilitates checking the reminder page by the user B on one hand, and can avoid hiding a communication message refreshed in a bottom area of the group chat communication session page on the other hand. Certainly, the reminder page may also use any form such as a pop-up window etc., which is not limited in the disclosure.

In the reminder page shown in FIG. 15A, the existence of a "auspicious time red envelope" from the user A is indicated by displaying an avatar of the user A and a text "an auspicious time red envelope from A" (i.e., there is a corresponding sending time, i.e., the "auspicious time"). At the same time, the client 2 may display a corresponding countdown by acquiring the sending time included in the red envelope reception notification, for example, countdown information shown in FIG. 15A indicates that there are "2 hours and 59 minutes and 20 seconds" left before the sending time.

Further, the reminder page may also comprise a reminder setting option. For example, the reminder setting option is located at the top-right corner of the reminder page shown in FIG. 15A. When the reminder setting option is detected to be triggered, the client 2 may create a reminder message for a corresponding red envelope reception notification (e.g., in the case of the enterprise instant messaging application "DING TALK," the reminder message may be a "DING message" that the "DING TALK" supports). The reminder time of the reminder message precedes the sending time by a first preset time period and the reminder object is the user B himself/herself. For example, after the reminder message is created, the reminder setting option may change from "reminder for grabbing" shown in FIG. 15A to "cancel reminder" (a click on the reminder setting option may cancel the above reminder message that has been established) shown in FIG. 15B. "Send a DING reminder 5 minutes before opening red envelopes" shown in FIG. 15B indicates that the client 2 configures the above first preset time period to be 5 minutes and configures the reminder method as "within an application," i.e., the client 2 may receive a reminder message sent by the client 2 himself/herself in 5 minutes before the sending time.

Certainly, the reminder message may also be sent by other methods. For example, when the reminder method is a "short message," an electronic apparatus that uses a communication number may receive a corresponding reminder short message in 5 minutes before it is the sending time based on the communication number bound by the user B in the "DING TALK." When the reminder method is a "phone call," the electronic apparatus may be called in 5 minutes before it is the sending time, and listen to reminder content broadcast by a voice after the call is connected.

Figure 15B:
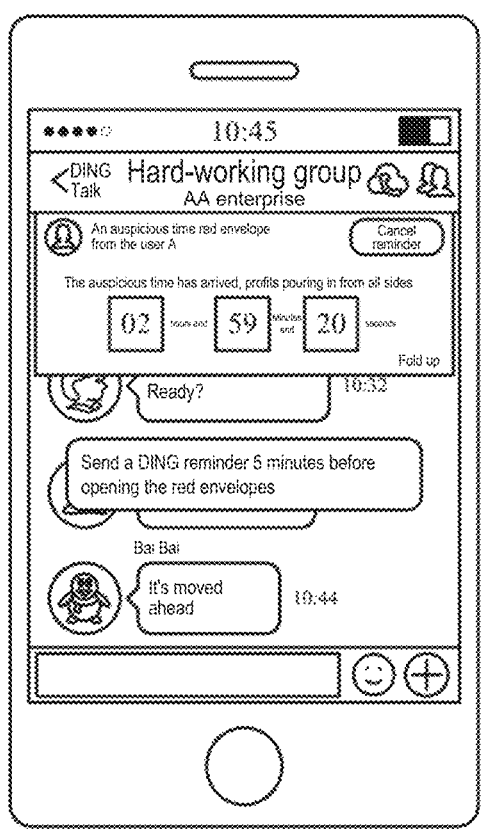
Figure 16A:
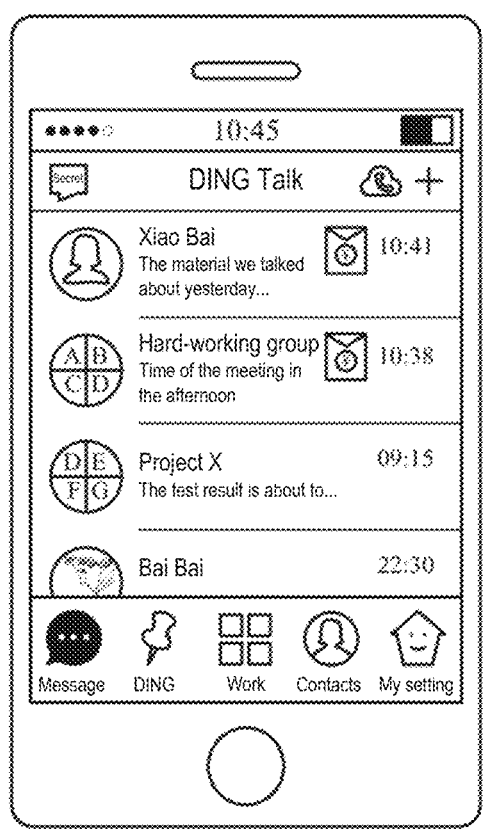

Furthermore, except that the above reminder page may be displayed in the communication session pages shown in FIGS. 15A-15B so the target user such as the user B etc. may accordingly determine that an auspicious time red envelope is present in the corresponding communication session, other methods may also be used to remind the target user. For example, FIG. 16A shows a session list page on the client used by the user B, the session list page including session page entries of communication sessions that the user B has been involved, such as a session page entry of a single chat communication session between the user B and a user "Xiao Bai," a session page entry of the group chat communication session corresponding to the "hard-working group," and a session page entry of a group chat communication session corresponding to a "project X" group, etc. in FIG. 16A. When a trigger operation for the session page entry of the group chat communication session corresponding to the "hard-working group" is detected, the view may switch to the communication session page of the group chat communication session corresponding to the "hard-working group" shown in FIG. 15A or FIG. 15B. As shown in FIG. 16A, when an auspicious time red envelope is present in the group chat communication session corresponding to the "hard-working group," a reminder icon may be displayed within the display area of the corresponding session page entry (e.g., the reminder icon may be a "red envelope" icon shown in FIG. 16A), so the user B can determine all communication sessions comprising the reminder red envelopes of which sending times have not expired, without entering the communication session pages corresponding to each of the communication sessions. Similarly, based on the session list page shown in FIG. 16A, a reminder red envelope of which the sending time has not expired is also present in the communication session corresponding to the user "Xiao Bai."

Figure 16B:
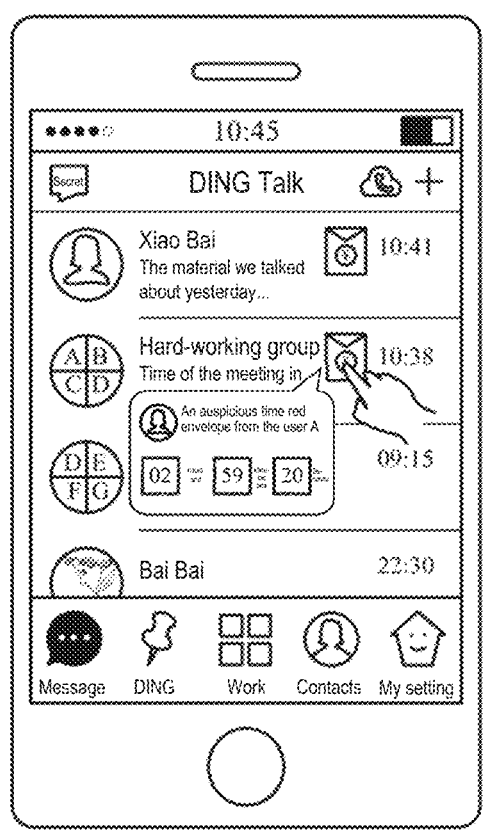

Further, the reminder icon shown in FIG. 16A may be configured in a type that can be triggered. In this way, when it is detected that the user B triggers, for example, the reminder icon in the session page entry corresponding to the "hard-working group," a pop-up window as shown in FIG. 16B may be displayed and a text "an auspicious time red envelope from A" and a countdown "2 hours and 59 minutes and 20 seconds" etc. are displayed within the pop-up window, which allows the user B to know information such as the source user of the auspicious time red envelope and a time period left before the sending time, etc.

Figure 17:
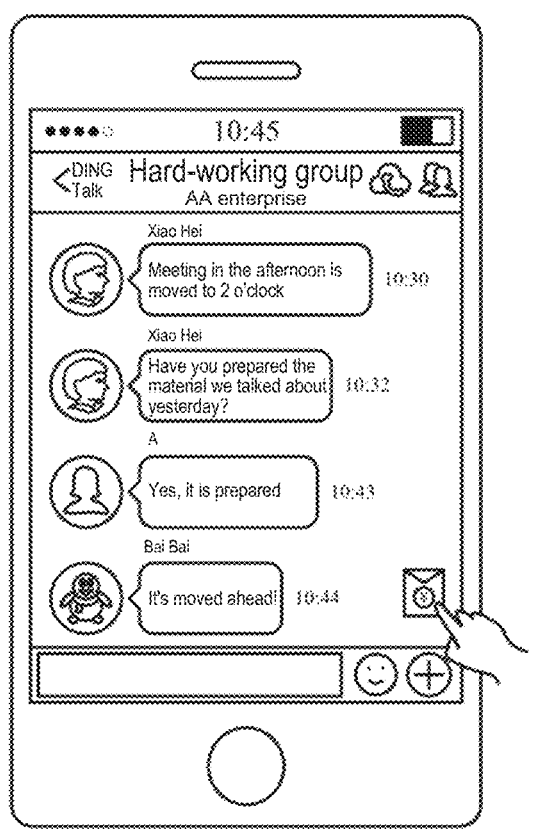
Figure 18:
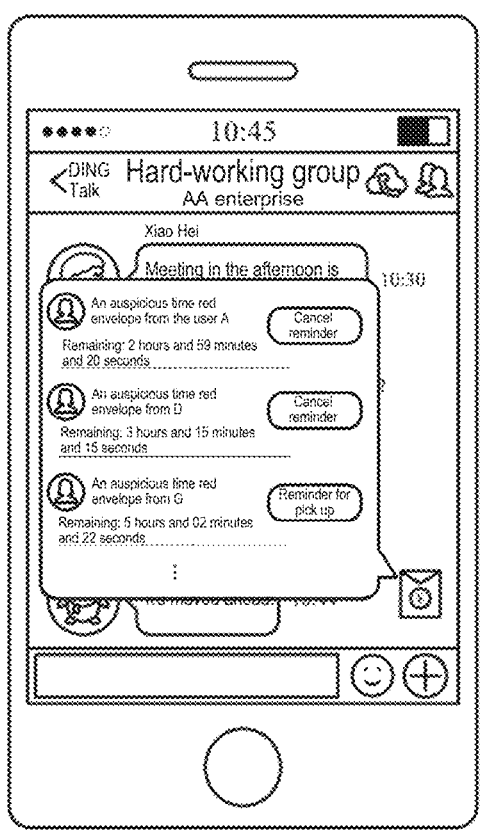

In this embodiment, since the reminder pages shown in FIGS. 15A-15B always hide the communication session page to a certain extent, when the client 2 detects that the user B triggers a "fold up" option at the bottom-right corner of the reminder page, the reminder page may be closed and an entry icon is displayed, for example, the entry icon may be the "red envelope" icon at the bottom-right corner of the communication session page shown in FIG. 17. In this way, when there is only one "auspicious time red envelope" of which the sending time, the client 2 may directly display the corresponding reminder page when detecting a trigger operation performed on the entry icon, i.e., return to the state shown in FIG. 15A or FIG. 15B; while there are simultaneously multiple "auspicious time red envelopes" of which sending times are not reached, the client 2 may display a notification list shown in FIG. 18 when detecting a trigger operation performed on the entry icon, wherein the notification list comprises all received red envelope reception notifications of which corresponding sending times have not expired, so the user B can quickly browse all of the red envelope reception notifications in the notification list simultaneously, and the above "reminder setting option" may be displayed for each of the red envelope reception notifications within the display area in the notification list, for ease of quick creation or cancellation of the corresponding reminder message.

Figure 19:
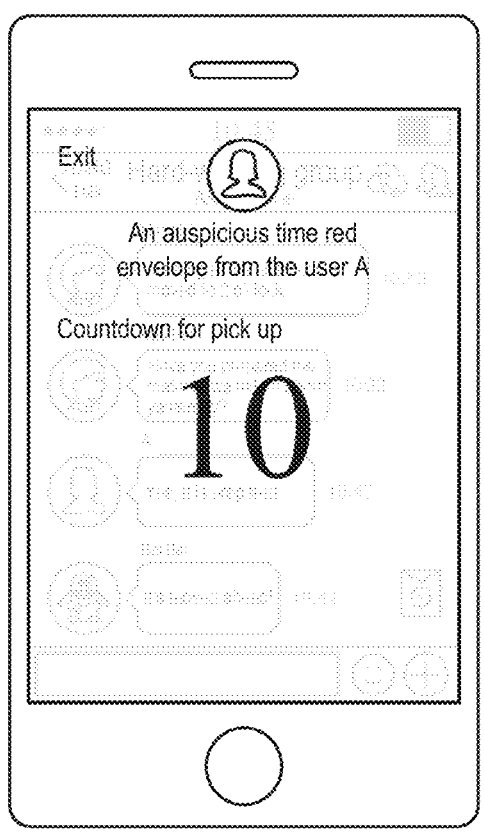

In this embodiment, no matter whether the above reminder message is created or not, when the current time precedes the sending time by a second preset time period, a countdown icon for the sending time may be displayed on other displayed content of the client of the target user in a superimposed fashion, until the sending time. For example, assuming that the second preset time period is 10 seconds, when there are only 10 seconds left before the countdown of the auspicious time red envelope from the user A, the client 2 may display the countdown icon as shown in FIG. 19 and the countdown icon is superimposed on all other displayed content such as the communication session page shown by the client 2 etc., to get the user B's focus of attention, this can effectively avoid the user B from missing the reception of the auspicious time red envelope, especially when the number of the red envelopes is less than the total number of the target users. Certainly, if the user B needs to deal with a more urgent thing, the user B may click "exit" at the top-left corner in FIG. 19 to cancel displaying of the corresponding countdown icon.

Figure 20:
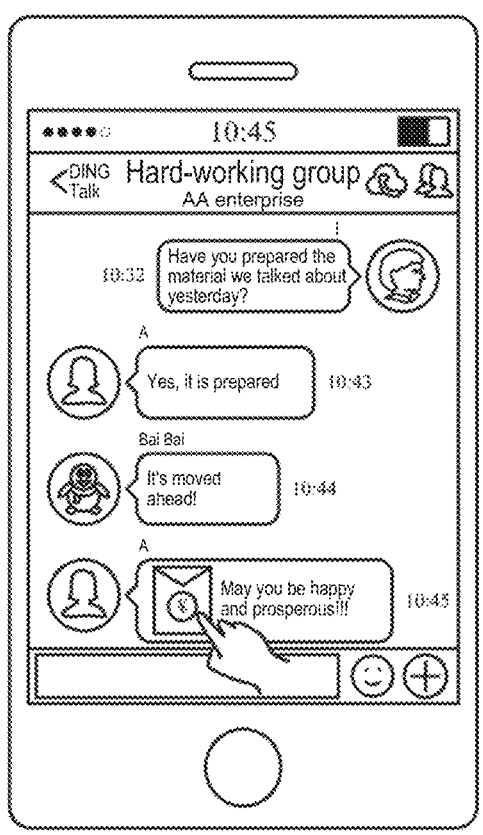

In this embodiment, the client 2 may display in the communication session page a red envelope message shown in FIG. 20, for a received red envelope reception notification. Further, when detecting a trigger operation performed on the red envelope message, the client 2 may display a red envelope reception page (equivalent to "the object request page" in the disclosure) shown in FIG. 21. When detecting a trigger operation performed on a "receive" option in the red envelope reception page, the client 2 determines that a trigger operation performed on the red envelope reception notification is detected. It can be appreciated from the above that in the disclosure, before the sending time, the client 2 restricts the reception time when the user B receives the corresponding red envelope money by managing a trigger permission for the red envelope reception notification; and the client 2 may manage the trigger permission for the red envelope reception notification by various methods. An auspicious time red envelope from the user A is taken as an example.

In one embodiment, before the sending time corresponding to the auspicious time red envelope, the client 2 may not display the red envelope message shown in FIG. 20, so the user B cannot trigger the red envelope message. Alternatively, the client 2 may display the red envelope message shown in FIG. 20, but does not display the red envelope reception page shown in FIG. 21 based on the trigger operation performed by the user B on the red envelope message, so the user B cannot trigger the "receive" option in the red envelope reception page. In summary, by restricting displaying of the red envelope message or the red envelope reception page, the trigger operation performed by the user B on the red envelope reception notification will not be detected by the client 2.

Figure 21:
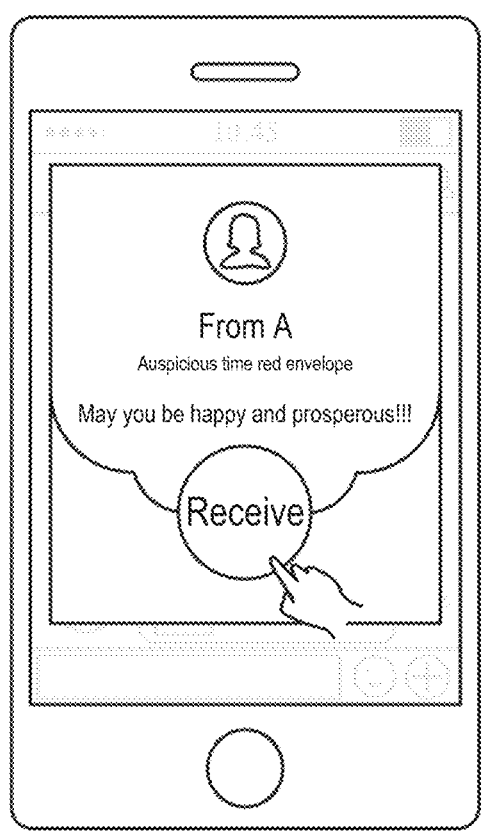

In another embodiment, the client 2 may display the red envelope message shown in FIG. 20 and display the red envelope reception page shown in FIG. 21 based on the trigger operation performed by the user B on the red envelope message, but when the user B triggers the "receive" option in the red envelope reception page to perform the trigger operation for the red envelope reception notification, the client 2 may not make a response to the trigger operation.

Certainly, when the sending time, by granting the trigger permission of the user B for the red envelope reception notification, the client 2 may send a corresponding red envelope reception request to the server when a trigger operation performed by the user B on the red envelope reception notification is detected (e.g., when a trigger operation performed on the "receive" option in the red envelope reception page shown in FIG. 21 is detected), so the server sends at least part of corresponding red envelope money to the user B. For example, when the user A uses the "lucky red envelope" type shown in FIG. 8, the red envelope money may be randomly allocated to all target users. As such, assuming that the client 2 determines, according to the reception result notification returned by the server, the reception result as follows: 2.88 yuan of the red envelope money is sent to the user B. The client 2 then may display the reception result in a result display page shown in FIG. 22 for the user B to know a related condition.

Figure 22:
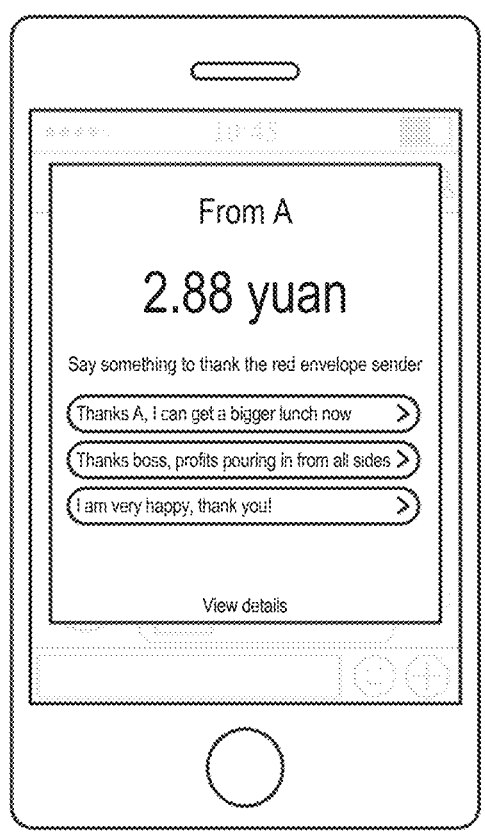
Figure 23:

In regard to the embodiment shown in FIG. 10, if the user A takes festival information corresponding to the current time into consideration through the client 1 during the process of sending red envelopes (e.g., since the current time is New Year or near New Year, the red envelope configuration page shown in FIG. 10 is configured with description information for the festival information, including a picture "Happy New Year" and a text "Happy New Year, All The Best" etc.), then the description information may be included in the red envelope sending message of step 406 and further included in the red envelope reception notification of step 412, so the client 2 may display a result display page shown in FIG. 23 in which the above picture "Happy New Year" and text "Happy New Year, All The Best" and other description information for "New Year" is displayed, to replace the result display page shown in FIG. 22. Certainly, the client 2 may also display the description information for the festival information in other pages, for example, in the red envelope reception page, which is not limited in the disclosure.

Figure 24:
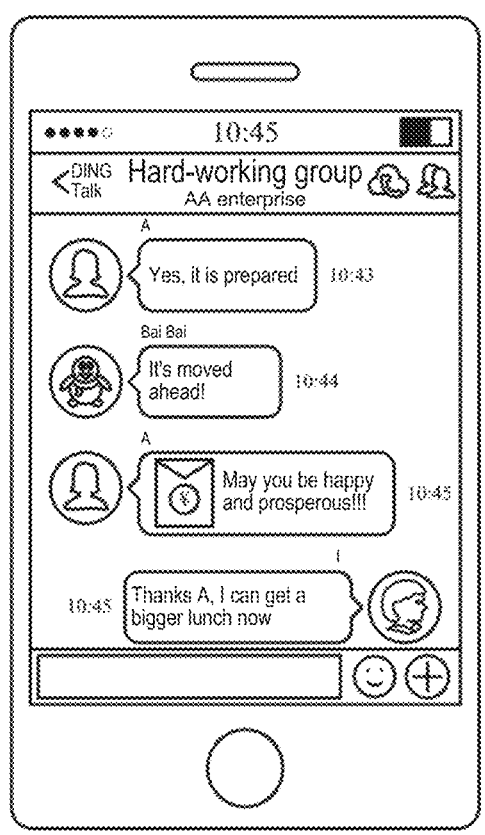

Further, by taking the result display page shown in FIG. 22 as an example, the result display page may also display predefined message-written-at-departure information, then when detecting a selection operation performed by the user B on any message-written-at-departure information, the client 2 may use selected message-written-at-departure information as communication content inputted by the user B to generate a corresponding communication message and send it in a corresponding communication session page. For example, when the user B selects "thanks to A, we can upgrade our lunch," FIG. 24 shows a corresponding communication message that has been sent. It is noted that: the client 2 predefines a message-written-at-departure template such as "thanks to *, we can upgrade our lunch"; after receiving a red envelope reception notification sent by the server, the client 2 determines a corresponding name of the target user and replaces the symbol "*" in the above message-written-at-departure template with the name to obtain corresponding message-written-at-departure information; and the client 2 only needs to directly display message-written-at-departure information that does not contain a user name. In this way, through displaying of the above message-written-at-departure information, the user B can make a quick speech in the corresponding communication session page by simply selecting the message-written-at-departure information without performing a content inputting operation, which helps to simplify user operations and improve the communication efficiency.

It is noted that the disclosure further provides other processing methods in addition to a permission managing method provided in one embodiment shown in FIG. 4, and may also restrict the reception time when the target user such as the user B etc. receives the red envelope money, so the reception time is not earlier than the sending time included in the red envelope reception notification.

In another embodiment, after receiving a red envelope sending message, the server may send a red envelope reception notification to the client 2 when delay lasts until a corresponding sending time. Since the sending time, the client 2 only needs to make a response to the trigger operation performed by the user B on the red envelope reception notification without delay similarly to the related art, to ensure that the reception time when the user B receives the red envelope money is not earlier than the sending time. In other words, in this embodiment, sending of the red envelope reception notification is controlled by the server to restrict the reception time when the user B receives the red envelope money, while the client 2 does not need to adopt a special processing means.

In another embodiment, after receiving the red envelope sending message, the server may send a red envelope reception notification to the client 2 without delay, and grant an acquisition permission of the user B for the red envelope money when it is the corresponding sending time. In other words, regardless of various processing means used by the client 2, including a conventional processing means in the related art or the permission controlling means in one embodiment shown in FIG. 4, in any case, since the server does not grant the acquisition permission for the red envelope money before it is the sending time, even though the client 2 sends a red envelope reception request to the server before the sending time, the red envelope reception request will not be responded by the server; and therefore, the user B cannot receive the red envelope money before the sending time, thus controlling the acquisition time when the user B receives the red envelope money to not happen before a recommendation time.

Figure 25:
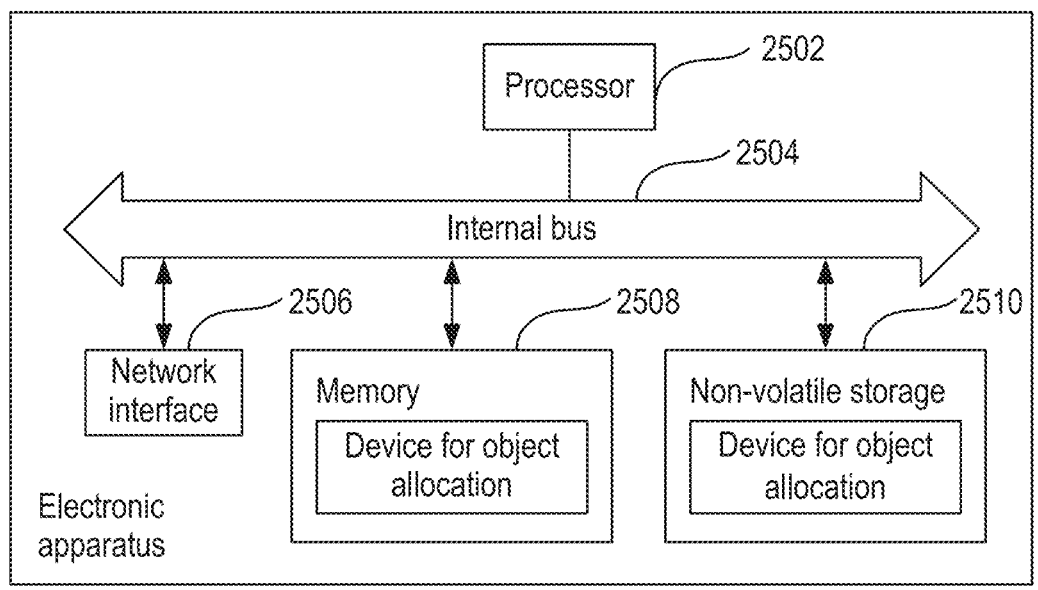
FIG. 25 is a block diagram of an electronic apparatus based on an allocation source according to some embodiments of the disclosure.

FIG. 25 is a block diagram of an electronic apparatus based on an allocation source according to some embodiments of the disclosure.

Referring to FIG. 25, at a hardware level, the electronic apparatus includes a processor 2502, an internal bus 2504, a network interface 2506, a memory 2508, and a nonvolatile memory 2510, and of course, may also include hardware required for other services. The processor 2502 reads a corresponding computer program from the nonvolatile memory 2510 into the memory 2508 and then runs the computer program, thereby forming a device for object allocation at a logical level. Certainly, in addition to a software implementation, the disclosure does not exclude other implementations such as logic devices or a combination of hardware and software, etc. That is to say, execution of the following processing flows is not limited to various logical units, and may also be performed by other hardware or logic devices.

Figure 26:
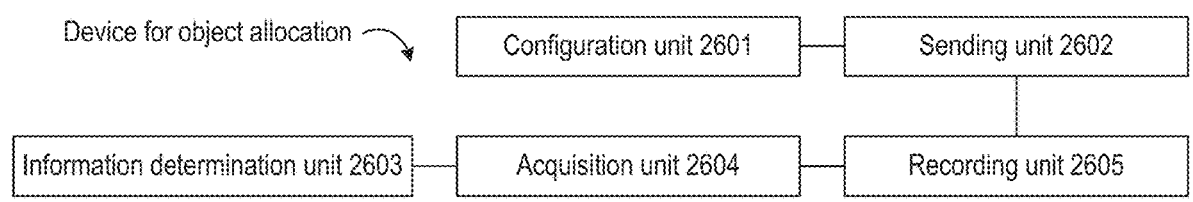
FIG. 26 is a block diagram illustrating a device for object allocation based on an allocation source according to some embodiments of the disclosure.

Referring to FIG. 26, in a software implementation, the device for object allocation may include a configuration unit 2601 and a sending unit 2602.

In the illustrated embodiment, the configuration unit 2601 is used for configuring the number of objects to be allocated and an object allocation time according to an object allocation request received by a client of an allocation source. The sending unit 2602 is used for sending an object allocation message to a server, the object allocation message comprising the number of objects to be allocated and the object allocation time, wherein the number of objects to be allocated is used to instruct the server to extract a corresponding number of objects to be allocated from an object set corresponding to the allocation source, and the object allocation time is used to instruct the server to control acquisition times when an allocation destination acquires the objects to be allocated, so the acquisition times do not happen before the object allocation time.

Optionally, the configuration unit 2601 configures the number of objects to be allocated by acquiring the number of objects to be allocated included in the object allocation request; or generating, by the allocation source client, a recommendation number satisfying a predefined number recommendation rule as the number of objects to be allocated.

Optionally, the configuration unit 2601 configures the object allocation time by acquiring the object allocation time included in the object allocation request; or generating, by the allocation source client, a recommendation time satisfying a predefined time recommendation rule.

Optionally, the configuration 2601 generates the recommendation time that satisfies the predefined time recommendation rule through the following: when the time recommendation rule comprises a recommendation condition for a first characteristic numerical value, generating the recommendation time with each of time positions being the first characteristic numerical value; and when the time recommendation rule comprises a discarding condition for a second characteristic numerical value, generating the recommendation time with each of time positions refraining from using the second characteristic numerical value.

Optionally, the configuration 2601 generates the recommendation time that satisfies the predefined time recommendation rule through the following: receiving a prompt message sent by the server, the prompt message comprising date information related to any of associated users of the allocation source; and when the time recommendation rule comprises an application condition for the date information, generating the recommendation time related to the date information if a response operation for the prompt message is detected.

Optionally, the configuration 2601 generates the recommendation time that satisfies the predefined time recommendation rule through the following: when the object allocation request is initiated for any group belonging to the allocation source, determining a used corresponding recommendation time according to the object allocation message sent by other group members in the any group to the server; and generating the recommendation time satisfying the time recommendation rule and is different from the used recommendation time.

Optionally, the device for object allocation further comprises: an information determination unit 2603, used for determining festival information corresponding to a reception time of the object allocation request; an acquisition unit 2604, used for acquiring description information related to the festival information; and a recording unit 2605, used for recording the description information in the object allocation message to instruct the allocation destination client to display the description information on a page related to the acquisition of the objects to be allocated.

Figure 27:
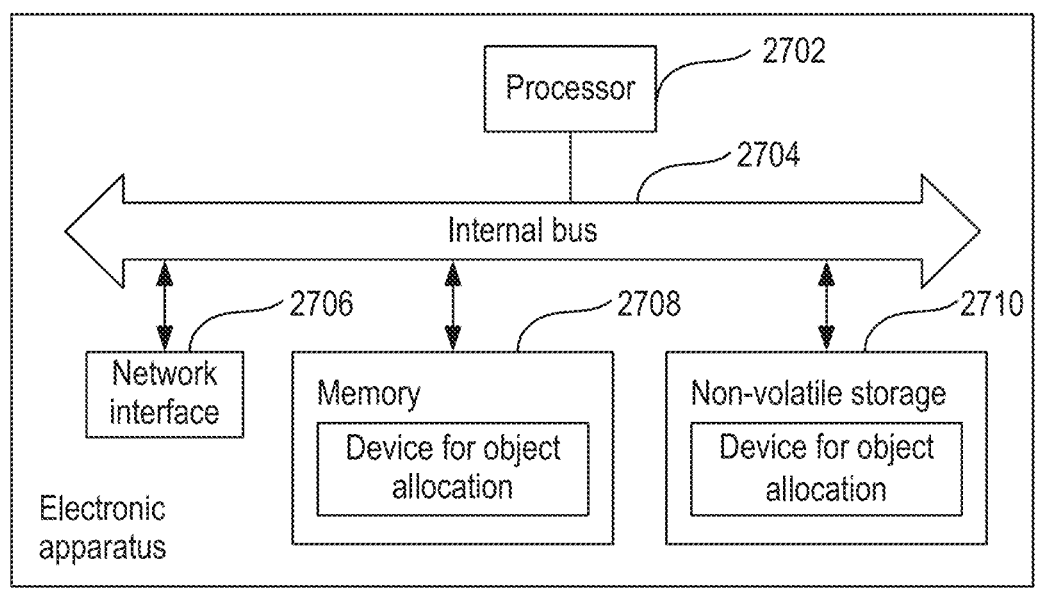
FIG. 27 is a block diagram illustrating an electronic apparatus based on a server according to some embodiments of the disclosure.

FIG. 27 is a block diagram illustrating an electronic apparatus based on a server according to some embodiments of the disclosure.

Referring to FIG. 27, at a hardware level, the electronic apparatus includes a processor 2702, an internal bus 2704, a network interface 2706, a memory 2708, and a nonvolatile memory 2710, and of course, may also include hardware required for other services. The processor 2702 reads a corresponding computer program from the nonvolatile memory 2710 into the memory 2708 and then runs the computer program, thereby forming a device for object allocation at a logical level. Certainly, in addition to a software implementation, the disclosure does not exclude other implementations such as logic devices or a combination of hardware and software, etc. That is to say, execution of the following processing flows is not limited to various logical units, and may also be performed by other hardware or logic devices.

Figure 28:
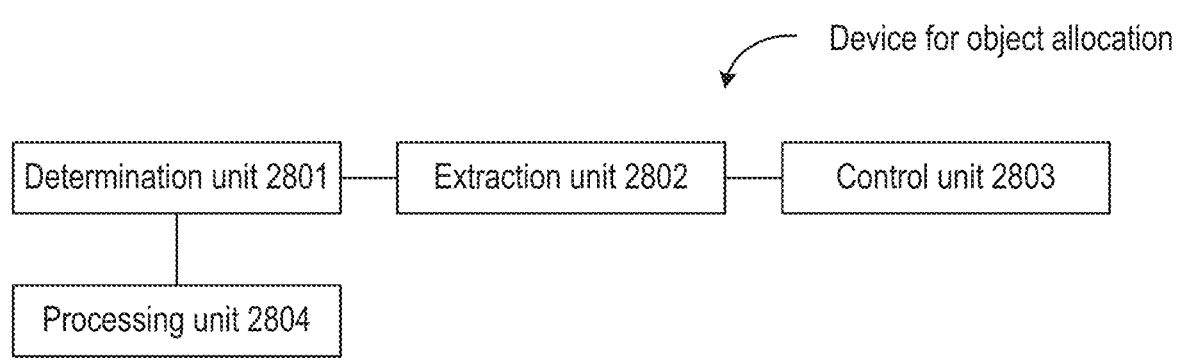
FIG. 28 is a block diagram illustrating a device for object allocation based on a server according to some embodiments of the disclosure.

Referring to FIG. 28, in a software implementation, the device for object allocation may include a determination unit 2801, an extraction unit 2802, and a control unit 2803. In the illustrated embodiment, the determination unit 2801 is used for determining an allocation source, the number of objects to be allocated, and an object allocation time according to an object allocation message received by a server; the extraction unit 2802 is used for extracting objects to be allocated corresponding to the number of objects to be allocated from an object set corresponding to the allocation source; and the control unit 2803 is used for, when the objects to be allocated are allocated to an allocation destination, controlling acquisition times when the allocation destination acquires the objects to be allocated, so the acquisition times do not happen before the object allocation time.

Optionally, the control unit 2803 is specifically used for: after receiving the object allocation message and delaying till it is the object allocation time, sending a first acquisition notification for the objects to be allocated to an allocation destination client, the first acquisition notification being used to instruct the allocation destination client to respond to a trigger operation for the first acquisition notification without delay; or after receiving the object allocation message, sending to the allocation destination client a second acquisition notification for the objects to be allocated without delay, the second acquisition notification comprising the object allocation time for instructing the allocation destination client to grant a trigger permission of the allocation destination for the second acquisition notification when delaying till it is the object allocation time; or after receiving the object allocation message, sending to the allocation destination client a third acquisition notification for the objects to be allocated without delay, and granting an acquisition permission of the allocation destination for the objects to be allocated when it is the object allocation time.

Optionally, the device for object allocation further comprises: a processing unit 2804, used for, when receiving respective object allocation messages for the group sent by a plurality of group members of the same group and object allocation times corresponding to the plurality of object allocation messages are identical, retaining the object allocation message having a maximum number of objects to be allocated, and canceling processing of other object allocation messages in the plurality of object allocation messages.

Figure 29:
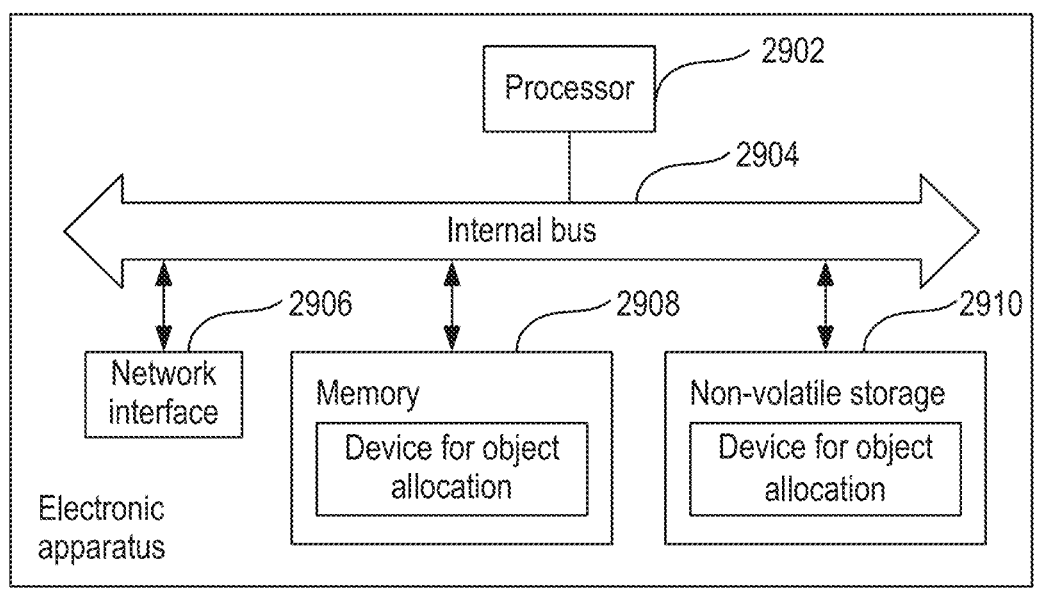
FIG. 29 is a block diagram illustrating an electronic apparatus based on an allocation destination according to some embodiments of the disclosure.

FIG. 29 is a block diagram illustrating an electronic apparatus based on an allocation destination according to some embodiments of the disclosure.

Referring to FIG. 29, at a hardware level, the electronic apparatus includes a processor 2902, an internal bus 2904, a network interface 2906, a memory 2908, and a nonvolatile memory 2910, and of course, may also include hardware required for other services. The processor 2902 reads a corresponding computer program from the nonvolatile memory 2910 into the memory 2908 and then runs the computer program, thereby forming a device for object allocation at a logical level. Certainly, in addition to a software implementation, the disclosure does not exclude other implementations such as logic devices or a combination of hardware and software, etc. That is to say, execution of the following processing flows is not limited to various logical units, and may also be performed by other hardware or logic devices.

Figure 30:
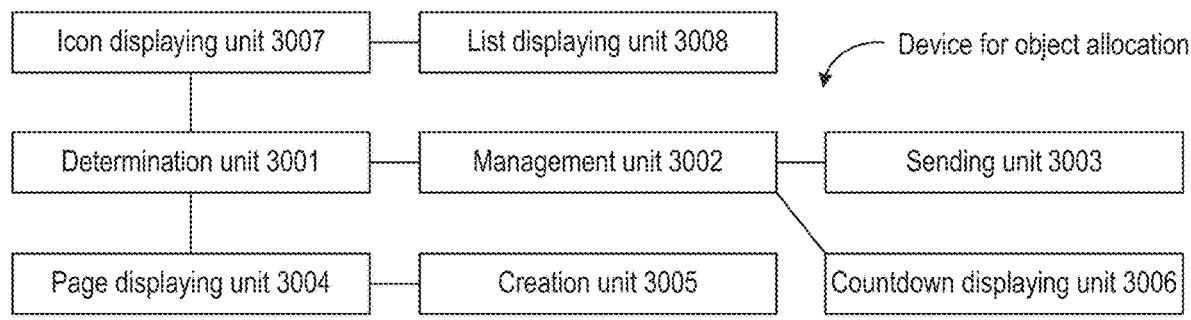
FIG. 30 is a block diagram illustrating a device for object allocation based on an allocation destination according to some embodiments of the disclosure.

Referring to FIG. 30, in a software implementation, the device for object allocation may include a determination unit 3001, a management unit 3002, and a sending unit 3003. In the illustrated embodiment, the determination unit 3001 is used for, according to an acquisition notification from a server that is received by a client of an allocation destination, determining an object allocation time included in the acquisition notification, wherein the acquisition notification is used to allocate objects to be allocated from an allocation source to the allocation destination, and the object allocation time is obtained after being configured by the allocation source; the management unit 3002 is used for, when it is not yet the object allocation time, restricting a trigger permission of the allocation destination for the acquisition notification; when it is the object allocation time, granting the trigger permission of the allocation destination for the acquisition notification; and the sending unit 3003 is used for, when the trigger permission is already granted, sending an object acquisition request to the server according to a detected trigger operation performed on the acquisition notification, to acquire at least part of the objects to be allocated.

Optionally, the device for object allocation further comprises: a page displaying unit 3004, used for, when receiving the acquisition notification, displaying a corresponding reminder page comprising a reminder setting option; and a creation unit 3005, used for, when detecting that the reminder setting option is triggered, creating a reminder message for the acquisition notification, wherein a reminder time of the reminder message precedes the object allocation time by a first preset time period, and a reminder object is the allocation destination.

Optionally, the device for object allocation further comprises: a countdown displaying unit 3006, used for, when a current time precedes the object allocation time by a second preset time period, displaying a countdown icon for the object allocation time on the other content displayed at the allocation destination client in a superimposed fashion until it is the object allocation time.

Optionally, the device for object allocation further comprises: an icon displaying unit 3007, used for displaying an entry icon within the allocation destination client; and a list displaying unit 3008, used for, when detecting that the entry icon is triggered, displaying a corresponding notification list comprising all received acquisition notifications with their corresponding object allocation times not being expired.

Figure 31:
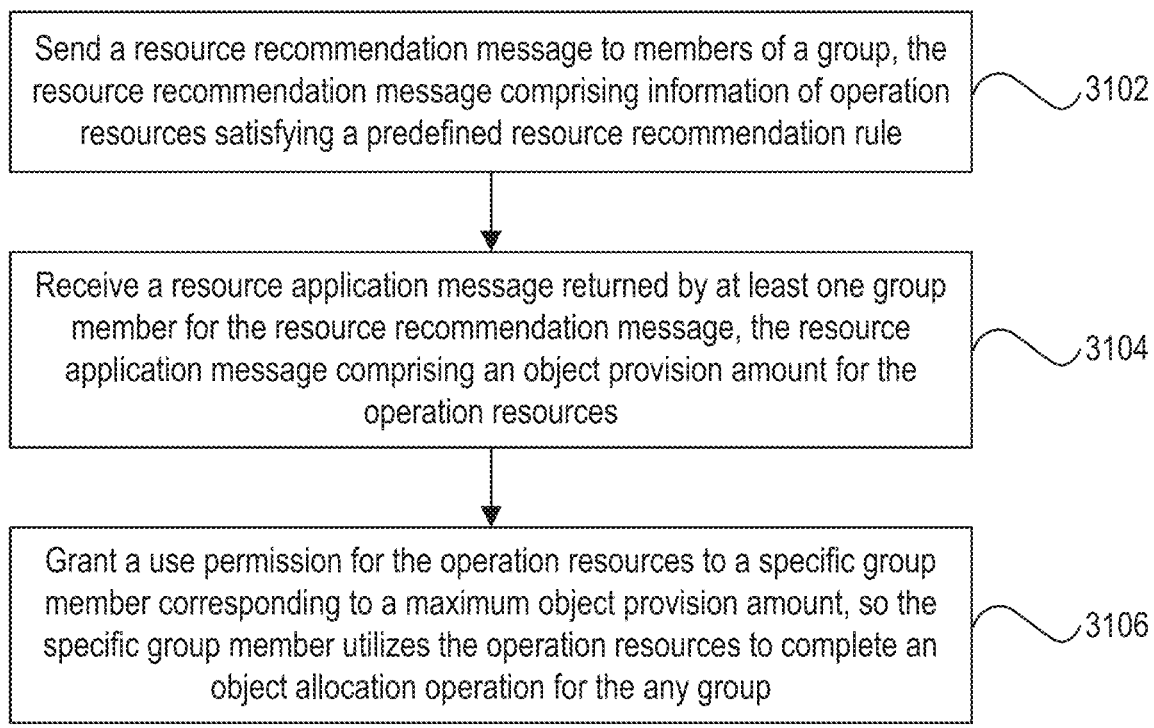
FIG. 31 is a flow diagram illustrating a method for object allocation based on a server according to some embodiments of the disclosure.

FIG. 31 is a flow diagram illustrating a method for object allocation based on a server according to some embodiments of the disclosure. As shown in FIG. 31, the method is applied to a server of a communication application, and the method may comprise the following steps.

Step 3102, send a resource recommendation message to members of a group, the resource recommendation message comprising information of operation resources satisfying a predefined resource recommendation rule.

Step 3104, receive a resource application message returned by at least one group member for the resource recommendation message, the resource application message comprising an object provision amount for the operation resources.

Step 3106, grant a use permission for the operation resources to a specific group member corresponding to a maximum object provision amount, so the specific group member utilizes the operation resources to complete an object allocation operation for the any group.

In this embodiment, the server can enable members of any group to compete for the same operation resource by sending a resource recommendation message to the group members of the any group, to grant a use permission for the operation resource to a group member with a greater demand, in order to achieve the goal of rational granting and allocation of operation resources.

In this embodiment, the operation resources include at least one of the following: time resources, time period resources, and geographical location resources. Certainly, the operation resources may also include other operation resources for performing an object allocation operation, which is not limited in the disclosure. For example, when the operation resources include a time resource, only group members granted with a corresponding operation permission can perform an object allocation operation for a corresponding group at a time corresponding to the time resource, while other group members in the corresponding group cannot use the time resource but can only perform an object allocation operation for the group at other times. Similarly, when the operation resources include a time period resource, only group members granted with a corresponding operation permission can perform an object allocation operation for a corresponding group at a time period corresponding to the time period resource. Moreover, when the operation resources include a geographic location resource, only group members granted with a corresponding operation permission can perform an object allocation operation for a corresponding group at a geographic location corresponding to the geographic location resource, repeated descriptions will be omitted herein.

A "sending red envelopes" scenario is used as an example. In regard to a "hard-working group" in an enterprise instant messaging application "DING TALK," assuming that a server (i.e., a DING TALK server) can determine information of corresponding operation resources in accordance with a predefined resource recommendation rule. For example, when the operation resources are the time resources, the predefined resource recommendation rule may be the predefined time recommendation rule in the above embodiment of the disclosure, and determined operation resources may be the above recommendation time. For example, when the predefined time recommendation rule comprises a recommendation condition for a first characteristic numerical value, for example, the first characteristic numerical value is a "auspicious time number," then the above recommendation time may be a "auspicious time" (it is noted that the "auspicious time" may be obtained through initiative calculation performed by the server in accordance with the time recommendation rule or may be manually set by a predefined user, provided that it satisfies the time recommendation rule). Below the operation resources determined by the server being the "auspicious time" is used as an example to provide illustrations.

Figure 32:
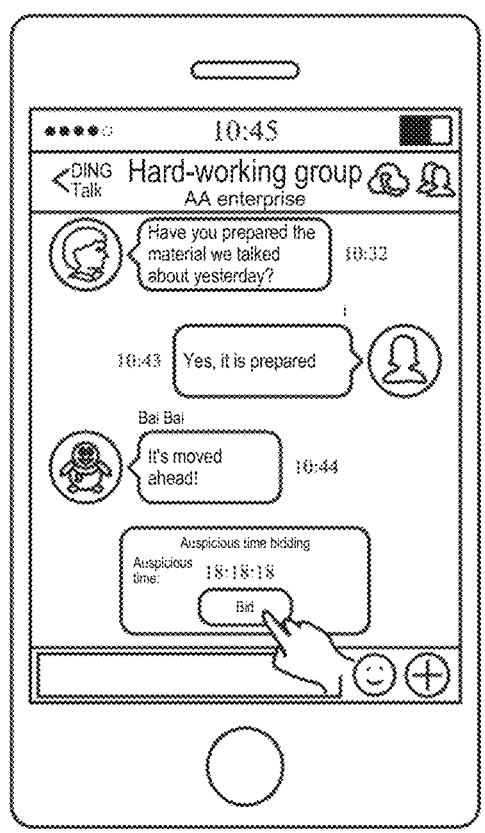
FIGS. 32-39 are user interface diagrams of another page for sending a red envelope according to some embodiments of the disclosure.

Assuming that a user A is a group member of the "hard-working group," FIG. 32 may be a corresponding group chat communication session page displayed by a DING TALK client of the user A, and the group chat communication session page may display content of a resource recommendation message sent by the server. The content may include "auspicious time: 18:18:18" and a trigger option for the auspicious time (e.g., shown as a "bid" option in FIG. 32). When a trigger operation for the "bid" option is detected, a bidding page shown in FIG. 33 may be displayed (e.g., a bidding page in the form of a "window" is used in FIG. 33), so the user A may configure "your bidding price." Further, the DING TALK client may return a bidding message (equivalent to the "resource application message" in the disclosure) to the server when detecting a trigger operation performed on a "confirm bidding" option, the bidding message comprising a bidding price configured by the user A for the auspicious time "18:18:18" (equivalent to the "object provision amount" in the disclosure).

Figure 34:
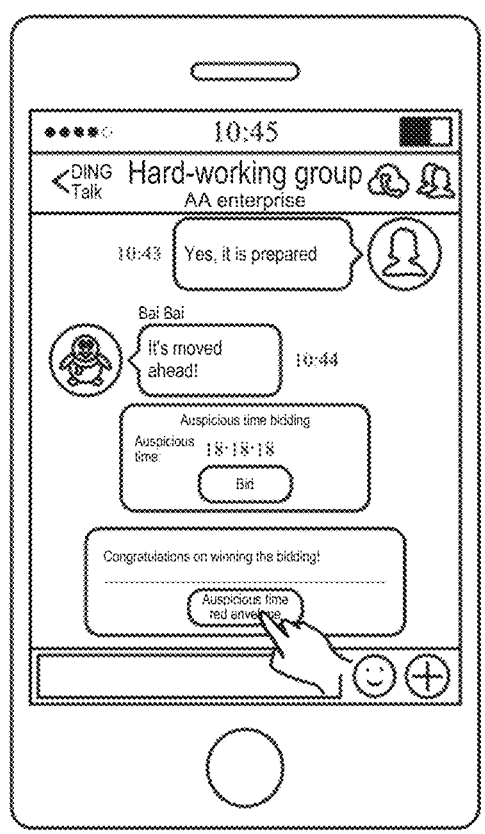

The server may receive the bidding message returned by each of group members and acquire the bidding price configured by each of the group members. Then the server may grant a use permission for the auspicious time "18:18:18" to a group member offering the highest bidding price. For example, when the user A offers the highest bidding price, the server may send a bidding success notification as shown in FIG. 34 to the user A to inform the user A of "congratulations on winning the bidding," then the user A may switch to the red envelope configuration page as shown in FIG. 14A (or other types of red envelope configuration pages only if they support the "send at an auspicious time" function) by triggering the bidding success notification (e.g., triggering the "auspicious time red envelope" shown in FIG. 34). The "send at an auspicious time" function may be automatically configured as "18:18:18" obtained from the bidding. The amount of money is automatically configured as the bidding price "188.88 yuan" of the user A. The user A shall not initiatively modify the "auspicious time" and the "amount of money." Certainly, if the user A is allowed to modify the "auspicious time" and the "amount of money," then the DING TALK client may send the red envelope as a common auspicious time red envelope without taking the use permission for the above auspicious time "18:18:18" obtained from the bidding.

The server may set a certain bidding rule for the auspicious time bidding, to improve the bidding efficiency. For example, in one embodiment, the server may specifies that: after each group member in the "hard-working group" has configured a corresponding bidding price, a group member offering the highest bidding price is selected and is granted with a use permission for a corresponding auspicious time, wherein each group member may have n biding chances (n is an integer not less than 1, wherein when n=1, it indicates that the group member is not allowed to modify the bidding price, and when n>1, it indicates that the group member may be allowed to modify the bidding prices for n−1 times). In another embodiment, the server may set a bidding time period for the auspicious time bidding. For example, the bidding page shown in FIG. 33 comprises a "remaining time," i.e., "00:04:58," of the bidding time period, which indicates that the corresponding auspicious time bidding ends after 4 minutes and 58 seconds. After the time period ends, the server selects the group member corresponding to the highest bidding price to grant the use permission for the corresponding auspicious time, wherein each group member may at least modify the bidding price once within the bidding time period.

Figure 33:
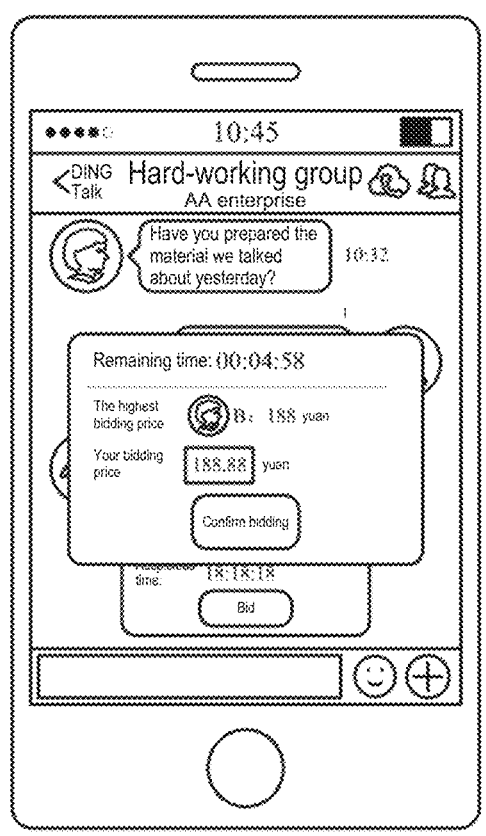
Figure 35:
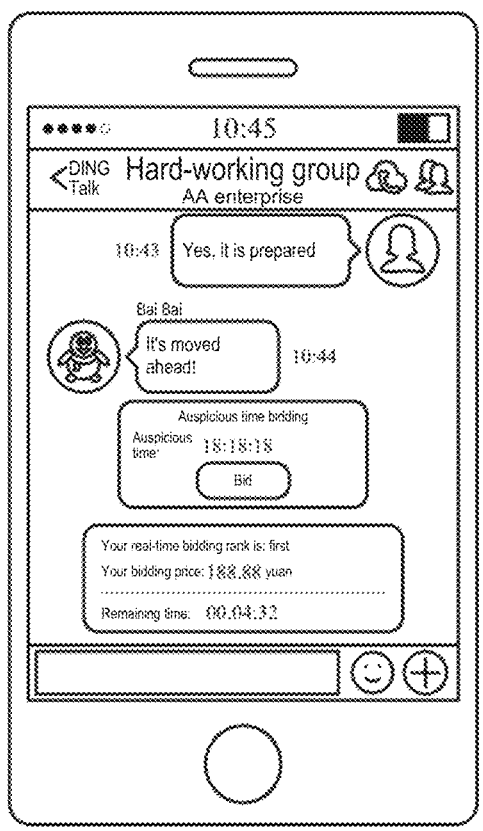
Figure 36:
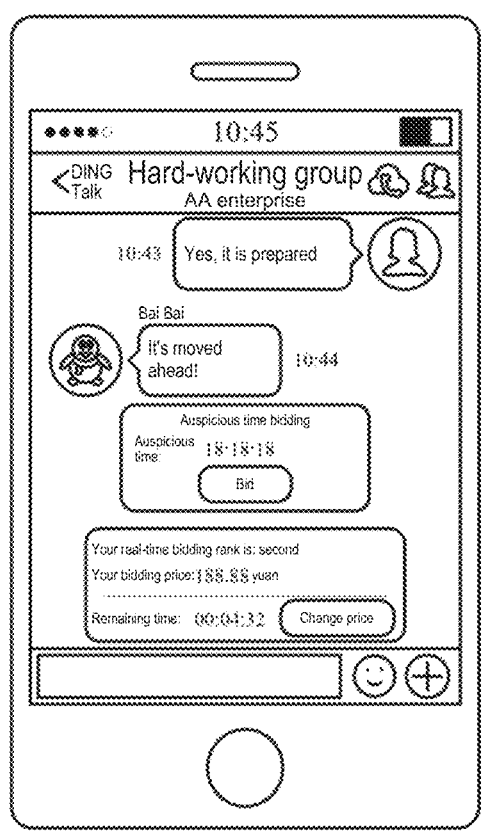
Figure 37:
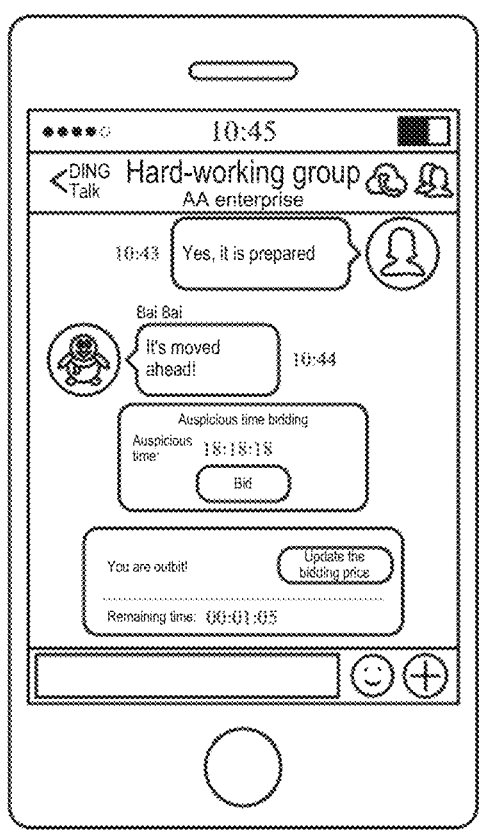

Providing the "bidding time period" is used as an example. After the user A completes bidding, real-time bidding information shown in FIG. 35 may be displayed. The real-time bidding information may include information such as a "real-time biding ranking," the "bidding price," and the "remaining time" etc. of the user A. Certainly, if the bidding price of the user A is not ranked first, as shown in FIG. 36, the real-time bidding information may include a "change price" option, so the user A may go to the bidding page as shown in FIG. 33 to change the bidding price by triggering the option. Moreover, when the bidding price of the user A is ranked first originally but then outstripped by other users later, the real-time bidding information may include "your bidding price is outstripped!" shown in FIG. 37 and provide an "update bidding price" option, so the user A may go to the bidding page as shown in FIG. 33 to change the bidding price according to the option.

Figure 38:
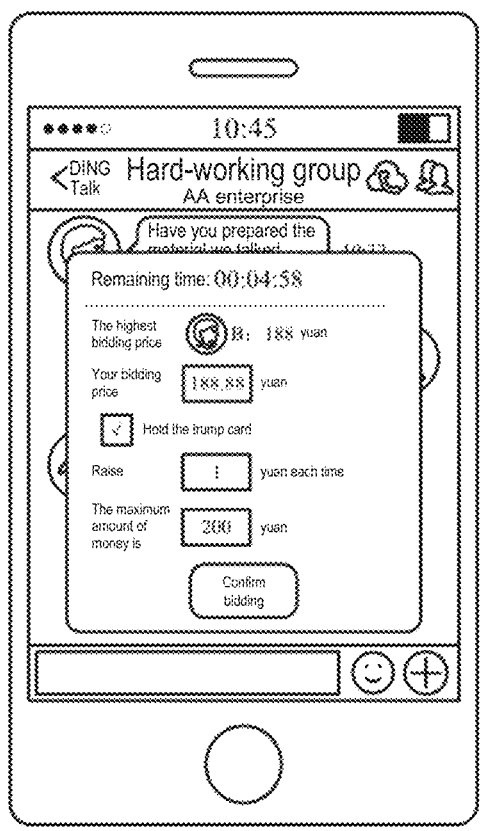

In addition to manual adjustment of the bidding price, the DING TALK client may also be configured to perform automatic price adjustment. For example, as shown in FIG. 38, the bidding page may include a "hold the trump card" option, when the user A selects this option, the bidding page may further provide a "raise a price each time" option and a "maximum amount of money" option. Then, the server may accordingly and automatically configure the bidding price of the user A. For example, when the price is raised by 1 yuan each time and the maximum amount of money is 200 yuan, if there is another user offering a higher bidding price than the bidding price of the user A, then as long as the bidding price of the another user does not exceed the maximum amount of money, i.e., 200 yuan, set by the user A, the server may automatically update the bidding price of the user A in units of 1 yuan each time. For example, assuming that the original bidding price of the user A is 188.88 yuan and a bidding price of another user H is 190 yuan, because 190>188.88, the server may add 1 yuan to the original bidding price to update the original bidding price to 189.88; because 189.88<190 and 189.88<200, the server continuously adds 1 yuan to update the bidding price to 190.88; and because 190.88>190 and 190.88<200, the server stops updating the bidding price of the user A. The bidding price of the user A is finally updated to 190.88 yuan and there is no higher bidding price, to ensure that the user A can win a use permission for a corresponding auspicious time.

Assuming that the use permission for the auspicious time "18:18:18" of the "hard-working group" is granted to the user A, then the user A can send red envelopes in the "hard-working group" at the auspicious time "18:18:18." As such, in the processing of receiving a red envelope sending message for the "hard-working group" subsequently, if the server finds that, for example, a user F applies for the use permission for the auspicious time "18:18:18" to the server (i.e., the use permission for the applied operation resources is already granted, and the granted object is different from the allocation source) by determining a corresponding source user and the applied auspicious time, since the use permission for the auspicious time "18:18:18" is already granted to the user A, the server may cancel processing of the red envelope sending message from the user F, that is to say, the user F cannot send red envelopes in the "hard-working group" at the auspicious time "18:18:18." Certainly, if the user F applies for other auspicious times for which use permissions are not granted, then the server may grant the use permission for the applied auspicious time to the user F.

As described above, the operation resources in the disclosure may also include many other types of resources in addition to the time resources. For example, when the operation resources include a time period resource, in regard to the above "send red envelopes" scenario, if a use permission for a certain time period in the "hard-working group" is granted to the user A, then only the user A can send red envelopes in the "hard-working group" during this time period, while other users are restricted from sending red envelopes in the "hard-working group" during this time period, which is similar to the above "auspicious time red envelope," and repeated descriptions will be omitted herein.

Figure 39:
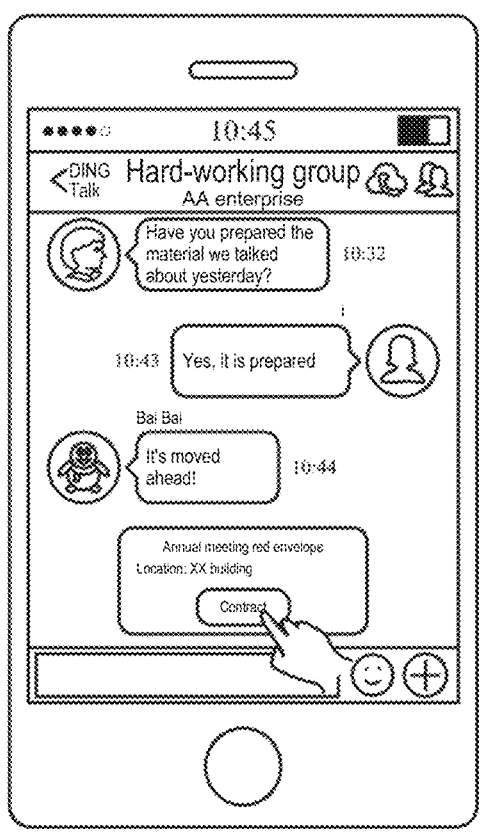

For another example, when the operation resources include a geographical location resource, a "location red envelope" similar to the above "auspicious time red envelope" may be achieved. As shown in FIG. 39, the server may determine a corresponding location according to a predefined resource recommendation rule (the location may be obtained through initiative calculation performed by the server according to the predefined resource recommendation rule, or the location may also be manually set by a predefined user; for example, the predefined user may be a group owner or a group manager etc.). For example, the location may be a "XX building" in FIG. 39 and the group members in the "hard-working group" need to hold an annual meeting at this place, then the group members such as the user A etc. in the "hard-working group" may bid for a use permission for the location "XX building" by triggering a "contract" option shown in FIG. 39. For example, assuming that the user A wins the use permission for the location "XX building" through bidding, then during the annual meeting, only the user A can perform a red envelope sending operation in the "hard-working group" within a certain range around the location "XX building," while other group members are restricted from performing the red envelope sending operation in the "hard-working group" when in the above range. Reference may be made to the above "auspicious time bidding" for the specific bidding process, and repeated descriptions will be omitted here.

Figure 40:
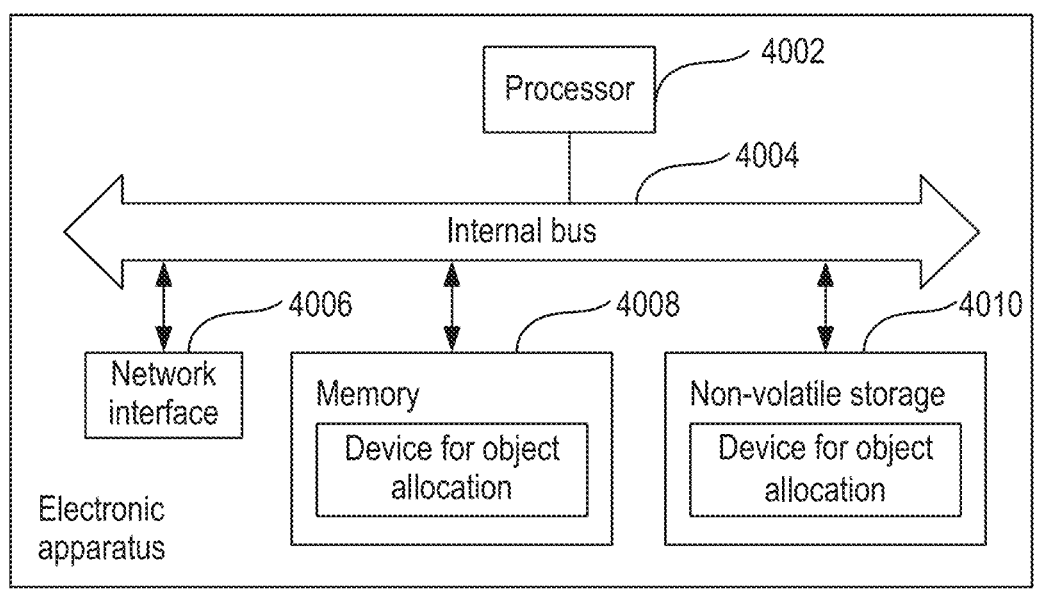
FIG. 40 is a block diagram illustrating an electronic apparatus based on a server according to some embodiments of the disclosure.

FIG. 40 is a block diagram illustrating an electronic apparatus based on a server according to some embodiments of the disclosure.

Referring to FIG. 40, at a hardware level, the electronic apparatus includes a processor 4002, an internal bus 4004, a network interface 4006, a memory 4008, and a nonvolatile memory 4010, and of course, may apparently include hardware required for other services. The processor 4002 reads a corresponding computer program from the nonvolatile memory 4010 into the memory 4008 and then runs the computer program, thereby forming a device for object allocation at a logical level. Certainly, in addition to a software implementation, the disclosure does not exclude other implementations such as logic devices or a combination of hardware and software, etc. That is to say, execution of the following processing flows is not limited to various logical units, and may also be performed by other hardware or logic devices.

Figure 41:
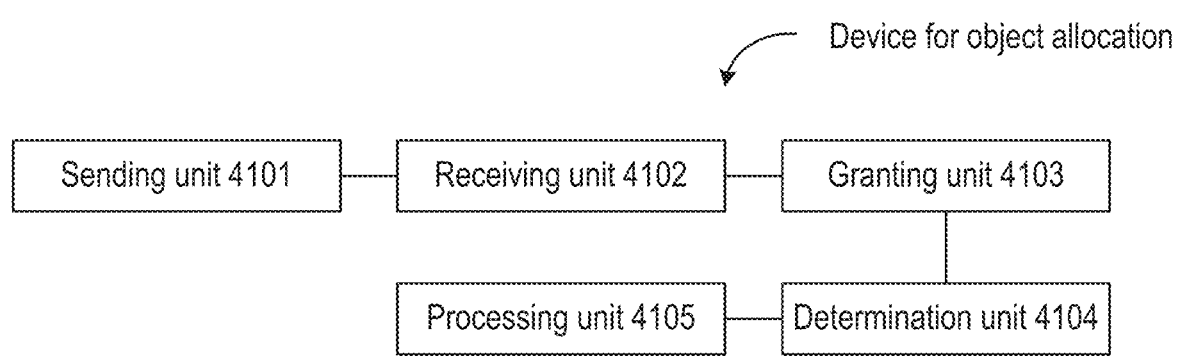
FIG. 41 is a block diagram illustrating a device for object allocation based on a server according to some embodiments of the disclosure.

Referring to FIG. 41, in the software implementation, the device for object allocation may include a sending unit 4101, a receiving unit 4102, and a granting unit 4103. In the illustrated embodiment, the sending unit 4101 is used for sending a resource recommendation message to members of any group, the resource recommendation message comprising information of operation resources satisfying a predefined resource recommendation rule; the receiving unit 4102 is used for receiving a resource application message returned by at least one group member for the resource recommendation message, the resource application message comprising an object provision amount for the operation resources; and the granting unit 4103 is used for granting a use permission for the operation resources to a specific group member corresponding to a maximum object provision amount, so the specific group member utilizes the operation resources to complete an object allocation operation for the any group.

Optionally, the operation resources comprise at least one of the following: time resources, time period resources, and geographic location resources.

Optionally, the device for object allocation further comprises: a determination unit 4104, used for determining an allocation source and information of applied operation resources according to a received object allocation message for the any group; and a processing unit 4105, used for, when the use permission for the applied operation resources is already granted and is granted to an object that is different from the allocation source, canceling processing of the object allocation message; and when the use permission for the applied operation resources is not granted, granting the use permission for the applied operation resources to the allocation source.

Figure 42:
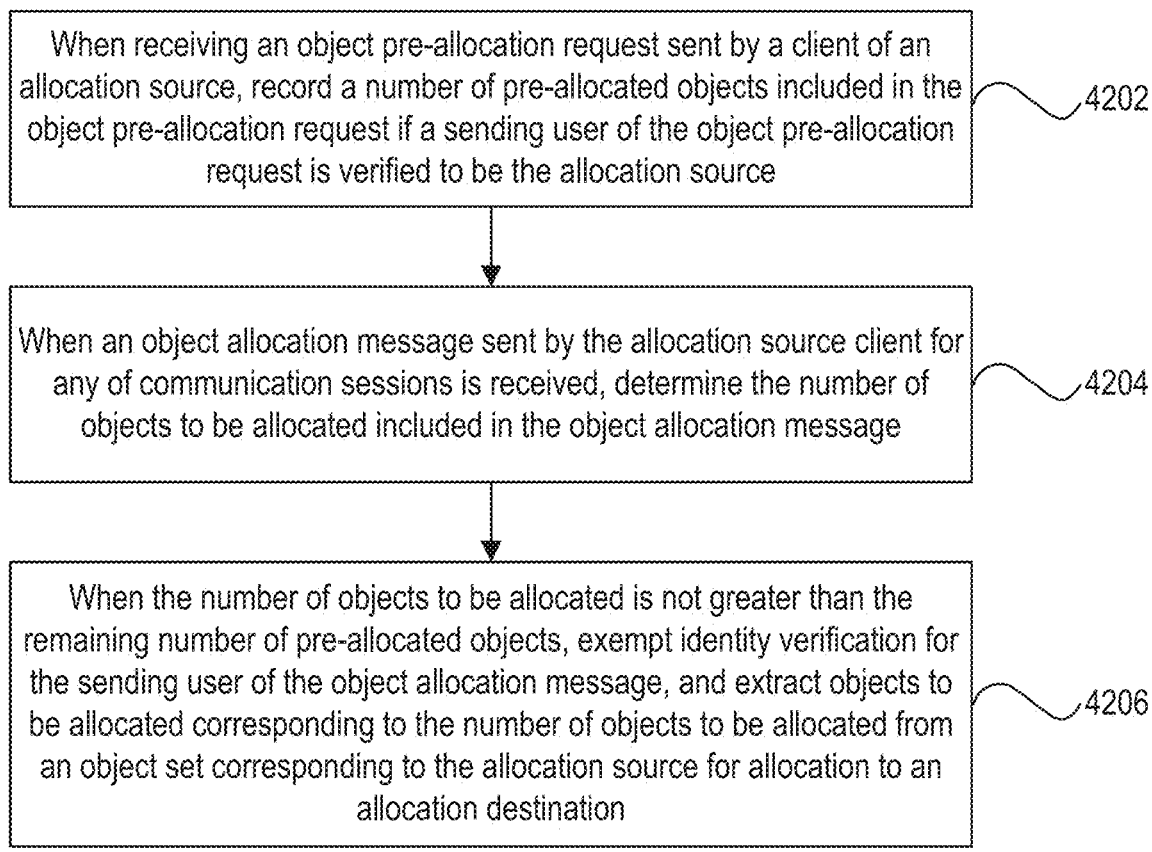
FIG. 42 is a flow diagram of a method for object allocation based on a server according to some embodiments of the disclosure.

FIG. 42 is a flow diagram of a method for object allocation based on a server according to some embodiments of the disclosure. As shown in FIG. 42, the method is applied to a server of a communication application, and may comprise the following steps.

Step 4202, when receiving an object pre-allocation request sent by a client of an allocation source, record a number of pre-allocated objects included in the object pre-allocation request if a sending user of the object pre-allocation request is verified to be the allocation source.

In this embodiment, all identity verification means in the related art can be applied in this embodiment. For example, a sending user of the object pre-allocation request may send a verification password to the server through an allocation source client, then the server may identify whether the sending user of the object pre-allocation request is the allocation source by matching the verification password with a predefined password corresponding to the allocation source. Alternatively, when the allocation source client runs on an electronic apparatus used by the allocation source, the allocation source client may invoke a fingerprint identification module of the electronic apparatus to perform identity identification on the sending user of the object pre-allocation request. Then, an identification result is reported to the server by the allocation source client.

In this embodiment, the "send red envelopes" scenario is used as an example. When the user A wants to send a red envelope to the user B through, for example, the DING TALK client 1, the server needs to ensure that the user who sends the red envelope is the user A himself/herself, since it is necessary to transfer the intra-account money of the user A to the user B's account, to avoid a circumstance that other people pretend to be the user A to transfer money after the electronic apparatus of the user A is lost or the account of the user A is stolen. Therefore, through the above identity verification means, the server can determine whether the user who sent the red envelope is the user A himself/herself.

Step 4204, when an object allocation message sent by the allocation source client for any of communication sessions is received, determine the number of objects to be allocated included in the object allocation message.

Step 4206, when the number of objects to be allocated is not greater than the remaining number of pre-allocated objects, exempt identity verification for the sending user of the object allocation message, and extract objects to be allocated corresponding to the number of objects to be allocated from an object set corresponding to the allocation source for allocation to an allocation destination.

In this embodiment, recording, by the server, the number of pre-allocated objects included in the object pre-allocation request after completion of identity verification is equivalent to pre-authorizing the corresponding number of objects. Therefore, if the number of objects to be allocated included in the object allocation message received subsequently is not greater than the recorded number of pre-allocated objects, it indicates that the object requested by the allocation message falls within the above "pre-authorized" range. The sending user of the object allocation message is directly determined as the above allocation source without performing identity verification.

Actually, as long as the object requested by the object allocation message does not exceed the above "pre-authorized" range, it may be considered that the object allocation message is already authorized. Therefore, the allocation source does not need to repeatedly participate in the identity verification process, which significantly simplifies the operations of the allocation source. During application to the "send red envelopes" scenario, the user A only needs to pass the identity verification once in advance and "pre-authorize"

a certain amount of money, then the user A may be exempted from the corresponding identity verification process as long as the amount of money in a subsequently sent red envelope does not exceed an amount of money in the "pre-authorized" range, which simplifies the operations of the user A. For example, the user A may "pre-authorize" 100 yuan in advance, then each time the user A sends a red envelope subsequently, the server may subtract a corresponding amount of red envelope money from the 100 yuan, so if the amount of money in a red envelope to be sent next does not exceed the remaining money of the "pre-authorized" money, the red envelope may be sent without identity verification; while if the amount of money in a red envelope to be sent next exceeds the remaining money of the "pre-authorized" money, the red envelope may be sent only after normal completion of identity verification.

In this embodiment, the object pre-allocation request may be directed at a specific communication session in which the allocation source participates. In this way, when receiving the object allocation message sent by the client of the application source, the sever needs to determine the remaining number of pre-allocated objects corresponding to a communication session according to the communication session at which the object allocation message is directed, and to accordingly determine whether identity verification needs to be performed on the sending user of the object allocation message.

Alternatively, the object pre-allocation request may be directed at all communication sessions in which the allocation source participates. In this way, when receiving the object allocation message sent by the allocation source client, the server determines whether identity verification needs to be performed on the sending user of the object allocation message according to the remaining number of pre-allocated objects corresponding to the object pre-allocation request, regardless of communication sessions at which the object allocation message is directed.

It is noted that: the embodiment shown in FIG. 42 may be applied to all of the technical solutions of the disclosure described above (e.g., step 204 in one embodiment shown in FIG. 2), so: when receiving the object allocation message sent by the allocation source client, the server may compare the corresponding number of objects to be allocated with the remaining number of pre-allocated objects, such that when the number of objects to be allocated is not greater than the remaining number of pre-allocated objects, objects to be allocated corresponding to the number of objects to be allocated may be extracted from an object set corresponding to the allocation source without performing identity verification on the sending user of the object allocation message; and, when the number of objects to be allocated is greater than the remaining number of pre-allocated objects or there is no pre-allocated object, the objects to be allocated corresponding to the number of objects to be allocated may be extracted from the object set corresponding to the allocation source only after performing identity verification on the sending user of the object allocation message.

Figure 43:
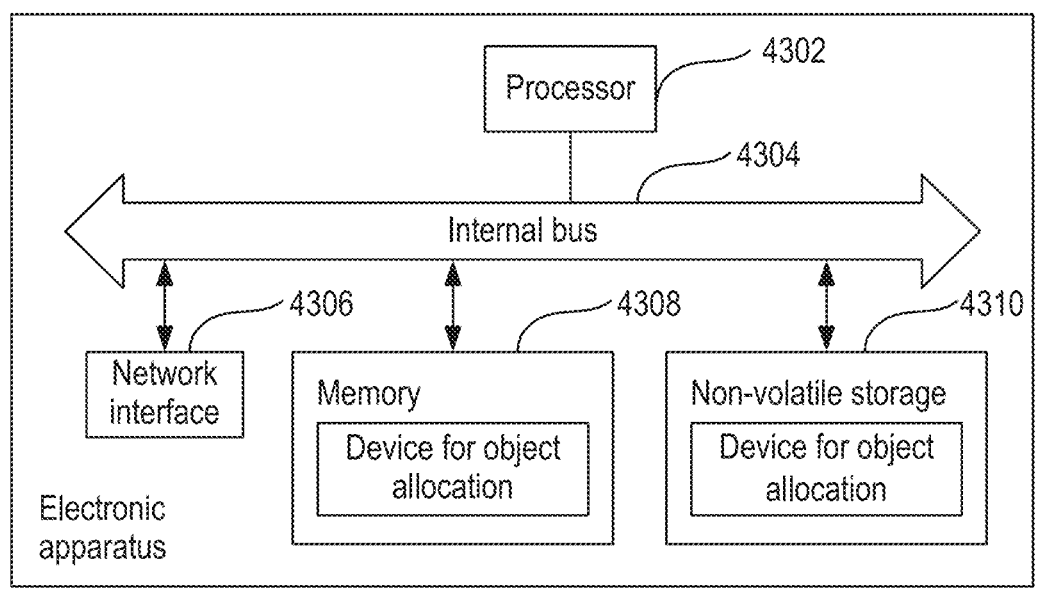
FIG. 43 is a block diagram illustrating an electronic apparatus based on a server according to some embodiments of the disclosure.

FIG. 43 is a block diagram illustrating an electronic apparatus based on a server according to some embodiments of the disclosure. Referring to FIG. 43, at a hardware level, the electronic apparatus includes a processor 4302, an internal bus 4304, a network interface 4306, a memory 4308, and a nonvolatile memory 4310, and of course, may also include hardware required for other services. The processor 4302 reads a corresponding computer program from the nonvolatile memory 4310 into the memory 4308 and then runs the computer program, thereby forming a device for object allocation at a logical level. Certainly, in addition to a software implementation, the disclosure does not exclude other implementations such as logic devices or a combination of hardware and software, etc. That is to say, execution of the following processing flows is not limited to various logical units, and may also be performed by other hardware or logic devices.

Figure 44:
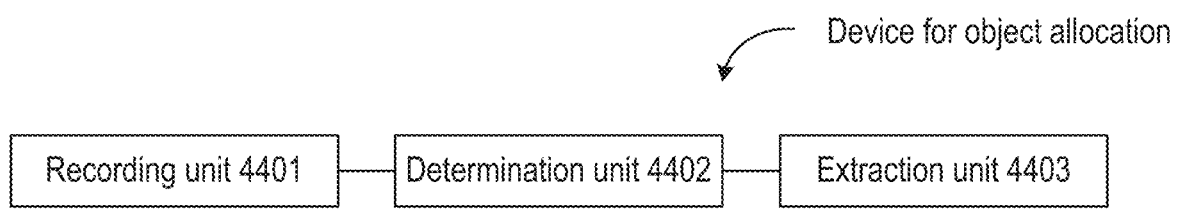
FIG. 44 is a block diagram illustrating a device for object allocation based on a server according to some embodiments of the disclosure.

Referring to FIG. 44, in the software implementation, the device for object allocation may include a recording unit 4401, a determination unit 4402, and an extraction unit 4403. Herein: the recording unit 4401 is used for, when receiving an object pre-allocation request sent by a client of an allocation source, recording a number of pre-allocated objects included in the object pre-allocation request if a sending user of the object pre-allocation request is verified to be the allocation source; the determination unit 4402 is used for, when receiving an object allocation message sent by an allocation source client for any communication sessions, determining the number of objects to be allocated included in the object allocation message; and the extraction unit 4403 is used for, when the number of objects to be allocated is not greater than the remaining number of the pre-allocated objects, skipping the verification for the sending user of the object allocation message, and extracting objects to be allocated corresponding to the number of objects to be allocated from an object set corresponding to the allocation source for allocation to an allocation destination.

The systems, devices, modules or units as set forth in the above embodiments may be specifically embodied by a computer chip or an entity, or by a product having a certain function. A typical implementation apparatus is a computer, the computer may be in a specific form of a personal computer, a laptop computer, a cellular phone, a camera phone, a smartphone, a personal digital assistant, a media player, a navigation device, an email receiving device, a game console, a tablet computer, a wearable device, or a combination of any of several apparatuses of these apparatuses.

In a typical configuration, the computer includes one or more processors (CPUs), input/output interfaces, network interfaces, and memories.

The memory may include a computer readable medium in the form of a non-permanent memory, a random access memory (RAM) and/or a non-volatile memory or the like, such as a read-only memory (ROM) or a flash memory (flash RAM). The memory is an example of a computer readable medium.

The computer readable medium includes permanent and non-permanent, movable and non-movable media that can achieve information storage by means of any methods or techniques. The information may be computer readable instructions, data structures, modules of programs or other data. Examples of storage media for a computer include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, read-only optical disk read-only memory (CD-ROM), digital versatile disc (DVD) or other optical storage, magnetic tape, magnetic disk storage or other magnetic storage apparatus or any other non-transmission medium that can be used to store information that can be accessed by a computing device. In light of the definitions herein, the computer readable medium does not include transitory computer readable media (transitory media), such as modulated data signals and carrier waves.

It is also to be noted that, the terms "comprising," "including," or any other variation thereof are intended to encompass a non-exclusive inclusion so a process, method, commodity, or apparatus that includes a series of elements includes not only those elements but also other elements not explicitly listed, or elements that are inherent to such a process, method, commodity, or apparatus. The element defined by the statement "comprising one . . . ," without further limitation, does not preclude the presence of additional identical elements in the process, method, commodity, or device that includes the element.

Exemplary embodiments will be described in detail here, and examples thereof are shown in the drawings. The following description refers to the drawings in which the same numbers in different drawings represent the same or similar elements unless otherwise indicated. Implementations described in the following exemplary embodiments are not representative of all embodiments consistent with the disclosure. Rather, they are merely examples of devices and methods consistent with some aspects of the disclosure as detailed in the appended claims.

The terms used in the disclosure are for the purpose of describing particular embodiments only and are not intended to limit the disclosure. The singular forms "a," "an" and "the" used in the disclosure and the appended claims are also intended to include plural forms, unless the context clearly indicates otherwise. It is also to be understood that the term "and/or" as used herein refers to and encompasses any or all possible combinations of one or more of the associated listed items.

It should be understood that although various types of information may be described using terms such as first, second, and third in the disclosure, such information should not be limited by these terms. These terms are only used to distinguish one type of information from another type of information. For example, first information may also be referred to as second information; similarly, second information may also be referred to as first information without departing from the scope of the disclosure. Depending on the context, the word "if" as used herein may be interpreted as "when . . . " or "upon . . . " or "in response to determining . . . ."

The above description includes only preferred embodiments of the disclosure, which are not intended to limit the disclosure. Any alterations, equivalent substitutions, and improvements etc. that are within the spirit and principle of the disclosure shall fall within the protection scope of the disclosure.

What is claimed is:

1. A method comprising:
   determining, by a server, a communication context of an allocation source and an allocation destination on a communication application, the communication context comprising a mode of communication of a communication application executed by the allocation source and the allocation destination;
   receiving, at the server, an object allocation message submitted by the allocation source via the communications application to allocate a number of to-be-allocated objects from an object set associated with the allocation source to the allocation destination, the object allocation message including an identification of the allocation source, the number of to-be-allocated objects, and an object allocation time, the object allocation destination being determined based on the communication context, the object allocation time generated by performing an operation selected from the group consisting of: selecting a preferred number associated with the allocation destination, and discarding one or more numbers not preferred by the allocation destination;
   extracting, by the server from the object set associated with the allocation source, objects corresponding to the number of to-be-allocated objects; and
   controlling, by the server, acquisition times when the allocation destination will acquire the objects, so that the acquisition times do not happen before the object allocation time.

2. The method of claim 1, wherein controlling acquisition times when the allocation destination will acquire the objects comprises:
   sending, by the server, a first acquisition notification for the objects to a client of the allocation destination at the object allocation time after receiving the object allocation message, the first acquisition notification being used to instruct the client of the allocation destination to respond to a trigger operation for the first acquisition notification without delay;
   sending, by the server to the client of the allocation destination, a second acquisition notification for the objects without delay after receiving the object allocation message, the second acquisition notification comprising the object allocation time for instructing the client of the allocation destination to grant a trigger permission of the allocation destination for the second acquisition notification when delaying until the object allocation time; or
   sending, by the server to the client of the allocation destination, a third acquisition notification for the objects without delay after receiving the object allocation message, and granting an acquisition permission of the allocation destination for the to-be-allocated objects when it is the object allocation time.

3. The method of claim 1, wherein the method further comprises retaining, by the server, the object allocation message having a maximum number of objects and canceling processing of other object allocation messages in the plurality of object allocation messages when receiving respective object allocation messages for the group sent by a plurality of group members of the same group and object allocation times corresponding to the plurality of object allocation messages are identical.

4. The method of claim 1, further comprising transmitting, by the server, an acquisition notification to the allocation destination, the acquisition notification including an object allocation time configured by an allocation source, wherein the acquisition notification is used to allocate objects from the allocation source to the allocation destination.

5. The method of claim 4, further comprising freezing, by the server, the objects prior to transmitting the acquisition notification.

6. The method of claim 1, further comprising:
   receiving, by the server, an object pre-allocation request sent by a client of an allocation source;
   recording, by the server, a number of pre-allocated objects included in the object pre-allocation request if the client of the allocation source is verified to be the allocation source;
   receiving, by the server, an object allocation message sent by the client of the allocation source;
   determining, by the server, the number of objects to be allocated included in the object allocation message; and when the number of objects to be allocated is not greater than the remaining number of pre-allocated objects, exempting, by the server, identity verification for the client of the allocation source, and extracting, by the server, objects to be allocated corresponding to the number of objects to be allocated from an object set corresponding to the allocation source for allocation to an allocation destination.

7. The method of claim 1, wherein the number of to-be-allocated objects and the object allocation time are configured by a client of the allocation source.

8. The method of claim 1, wherein the number of to-be-allocated objects is generated using one of a random rule, a numerical range rule, and a proportion rule.

9. A device comprising:
a processor; and
a storage medium for tangibly storing thereon program logic for execution by the processor, the stored program logic comprising:
  logic, executed by the processor, for determining a communication context of an allocation source and an allocation destination on a communication application, the communication context comprising a mode of communication of a communication application executed by the allocation source and the allocation destination;
  logic, executed by the processor, for receiving an object allocation message submitted by the allocation source via the communications application to allocate a number of to-be-allocated objects from an object set associated with the allocation source to the allocation destination, the object allocation message including an identification of the allocation source, the number of to-be-allocated objects, and an object allocation time, the object allocation destination being determined based on the communication context, the object allocation time generated by performing an operation selected from the group consisting of: selecting a preferred number associated with the allocation destination, and discarding one or more numbers not preferred by the allocation destination;
  logic, executed by the processor, for extracting, from the object set associated with the allocation source, objects corresponding to the number of to-be-allocated objects;
  logic, executed by the processor, for controlling acquisition times when the allocation destination will acquire the objects, so that the acquisition times do not happen before the object allocation time.

10. The device of claim 9, wherein the logic for controlling acquisition times comprises:
  logic, executed by the processor, for sending a first acquisition notification for the objects to a client of the allocation destination at the object allocation time after receiving the object allocation message, the first acquisition notification being used to instruct the client of the allocation destination to respond to a trigger operation for the first acquisition notification without delay;
  logic, executed by the processor, for sending, to the client of the allocation destination, a second acquisition notification for the objects without delay after receiving the object allocation message, the second acquisition notification comprising the object allocation time for instructing the client of the allocation destination to grant a trigger permission of the allocation destination for the second acquisition notification when delaying until the object allocation time; or
  logic, executed by the processor, for sending, to the client of the allocation destination, a third acquisition notification for the objects without delay after receiving the object allocation message, and granting an acquisition permission of the allocation destination for the to-be-allocated objects when it is the object allocation time.

11. The device of claim 9, further comprising logic, executed by the processor, for retaining the object allocation message having a maximum number of objects and canceling processing of other object allocation messages in the plurality of object allocation messages when receiving respective object allocation messages for the group sent by a plurality of group members of the same group and object allocation times corresponding to the plurality of object allocation messages are identical.

12. The device of claim 9, further comprising logic, executed by the processor, for transmitting an acquisition notification to the allocation destination, the acquisition notification including an object allocation time configured by an allocation source, wherein the acquisition notification is used to allocate objects from the allocation source to the allocation destination.

13. The device of claim 12, further comprising logic, executed by the processor, for freezing the objects prior to transmitting the acquisition notification.

14. The device of claim 9, further comprising:
  logic, executed by the processor, for receiving an object pre-allocation request sent by a client of an allocation source;
  logic, executed by the processor, for recording a number of pre-allocated objects included in the object pre-allocation request if the client of the allocation source is verified to be the allocation source;
  logic, executed by the processor, for receiving an object allocation message sent by the client of the allocation source;
  logic, executed by the processor, for determining the number of objects to be allocated included in the object allocation message; and
  logic, executed by the processor, for exempting identity verification for the client of the allocation source when the number of objects to be allocated is not greater than the remaining number of pre-allocated objects, and extracting objects to be allocated corresponding to the number of objects to be allocated from an object set corresponding to the allocation source for allocation to an allocation destination.

15. The device of claim 9, further comprising logic, executed by the processor, for transmitting, to a client device of an allocation destination, an acquisition notification, the acquisition notification including an object allocation time configured by an allocation source, wherein the acquisition notification is used to allocate objects from the allocation source to the allocation destination.

* * * * *